(12) United States Patent
Potts et al.

(10) Patent No.: US 10,996,658 B1
(45) Date of Patent: May 4, 2021

(54) DYNAMICALLY REALLOCATING STATE MACHINES

(71) Applicant: SalesWarp, Baltimore, MD (US)

(72) Inventors: David Potts, Baltimore, MD (US); Brian Hamilton, Baltimore, MD (US)

(73) Assignee: 6TH STREET, INC., Baltimore, MD (US)

( * ) Notice: Subject to any disclaimer, the term of this patent is extended or adjusted under 35 U.S.C. 154(b) by 0 days.

(21) Appl. No.: 15/863,607

(22) Filed: Jan. 5, 2018

Related U.S. Application Data

(60) Provisional application No. 62/442,611, filed on Jan. 5, 2017.

(51) Int. Cl.
G05B 19/418 (2006.01)

(52) U.S. Cl.
CPC ........... *G05B 19/41835* (2013.01); *G05B 2219/32403* (2013.01)

(58) Field of Classification Search
CPC .............. G05B 19/41835; G05B 2219/32403
USPC ........................................................... 700/28
See application file for complete search history.

(56) References Cited

U.S. PATENT DOCUMENTS

| | | | |
|---|---|---|---|
| 7,565,304 B2 | 7/2009 | Casati et al. | |
| 8,732,282 B1* | 5/2014 | Waas | G06F 11/0709 709/221 |
| 2002/0103663 A1* | 8/2002 | Bankier | G06Q 20/00 709/224 |
| 2008/0036488 A1* | 2/2008 | Kelem | G06F 15/7867 326/10 |
| 2008/0168010 A1* | 7/2008 | Challenger | G06F 9/4856 706/12 |
| 2009/0198532 A1 | 8/2009 | Litoiu et al. | |
| 2011/0166688 A1* | 7/2011 | Moyne | G05B 19/41865 700/104 |
| 2015/0019284 A1 | 1/2015 | Kwan et al. | |
| 2016/0048803 A1* | 2/2016 | Cen | G06Q 10/08355 705/338 |

(Continued)

OTHER PUBLICATIONS

Berkane, Mohamed Lamine, et al., "A Pattern-Based Architecture for Dynamically Adapting Business Processes," The Fourth International Conferences on Pervasive Patterns and Applications, Patterns 2012, pp. 29-35.

(Continued)

*Primary Examiner* — Kenneth M Lo
*Assistant Examiner* — Michael W Choi
(74) *Attorney, Agent, or Firm* — Nixon & Vanderhye PC

(57) ABSTRACT

The systems and methods described provide improved process control operating range and capabilities and integrate process control monitoring and management with broader process automation (PA) systems process management, extending the real-time operation and control of a process control system to process handling of a PA system, and extending PA-style process management by adding real-time process controls and monitoring, and adding new functionality by permitting management of these processes to externally defined completion goals. This combination provides new functionality in dynamically determined process flexibility, extended operating range and extended process recipe definition capabilities for process control systems using this technology, and provides improved error recovery and exception handling of traditional PA systems.

26 Claims, 11 Drawing Sheets

(56) References Cited

U.S. PATENT DOCUMENTS

2017/0249574 A1   8/2017   Knijnik et al.

OTHER PUBLICATIONS

De Carolis, Berardina, et al., "Incremental Learning of Daily Routines as Workflows in a Smart Home Environment," ACM Transactions on Interactive Intelligent Systems, Jan. 2015, pp. 39:1-39:24.
Hermosillo, Gabriel, et al., "Complex Event Processing or Context-Adaptive Business Processes," Belgium-Netherlands Software Evolution Seminar, Dec. 2009, pp. 19-24.
Kress, Markus, "Intelligent Business Process Optimization for the Service Industry," Dissertation, Universität Karlsruhe, Jul. 2009, 334 pages.
Metzger, Andreas, et al., "Comparing and Combining Predictive Business Process Monitoring Techniques," IEEE Transactions on Systems, Man, and Cybernetics: Systems, 2014, pp. 1-15.
Wetzstein, Branimir, et al., "Monitoring and Analyzing Influential Factors of Business Process Performance," Proceedings of the 13th IEEE International Conference on Enterprise Distributed Object Computing, Sep. 2009, pp. 118-127.

\* cited by examiner

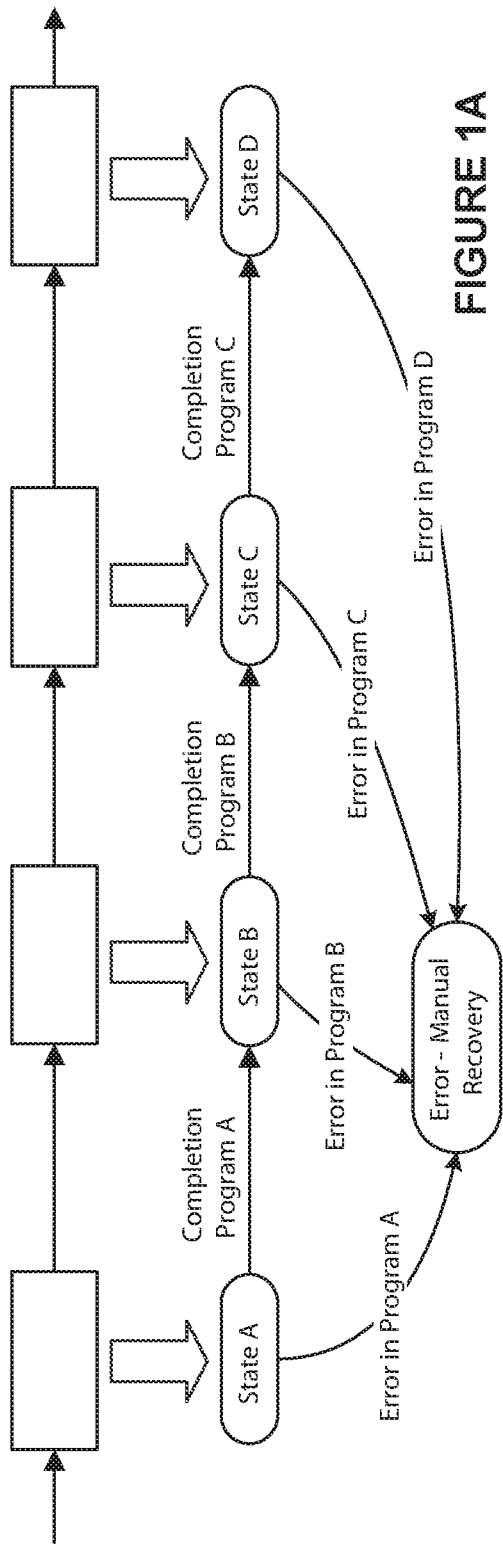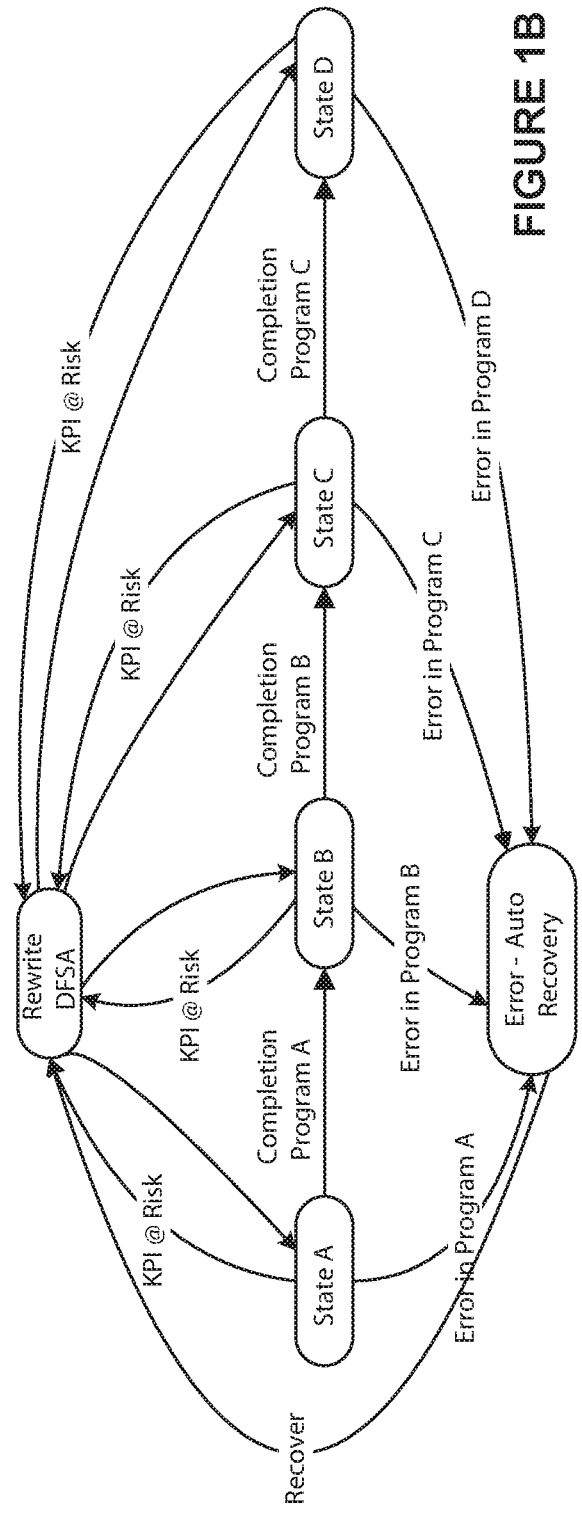
FIGURE 1A
FIGURE 1B

DYNAMICALLY REALLOCATING STATE MACHINES

1 CROSS-REFERENCE TO RELATED APPLICATIONS

The present application claims priority under 35 U.S.C. § 119(e) to provisional U.S. Patent Application Ser. No. 62/442,611 filed Jan. 5, 2017, which is incorporated herein by reference in its entirety and for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2017-2018 Saleswarp, LLC.

3 FIELD

The exemplary, illustrative, technology herein relates to systems, software, and methods for improvement of computer controlled systems. The technology herein has applications in the areas of process control systems, manufacturing control, and in the automation of computerized operations and their interface to higher level control limits without customized logic.

BACKGROUND AND SUMMARY Computer implemented process control systems provide control and management of industrial production systems, including most industrial processes in chemical, coatings, machining, manufacturing, and other industries worldwide. These systems provide for the computer-based monitoring of process conditions and real time or near real time adjustment of operating, tooling, and operating conditions to produce the desired products within manufacturing specifications. These systems traditionally focus on managing industrial processes within defined process ranges, and are characterized by real-time or near real-time control of process parameters. Examples of these operating ranges may include defined product or material specifications, machining tolerances, mixing and reaction process times, and operating temperature and pressure ranges. These real time adjustments are limited in range to those conditions permitted by the "recipe" that defines the production. Out-of-range conditions typically cause the process to halt until an operator can intervene and correct the condition. Out of range conditions are more common in other areas where systems manage uncontrollable aspects of the process, such as processes that involve external factors, human-participating processes, or poorly defined processes.

Operations are traditionally managed and controlled by legacy process automation (PA) systems, which are computer controlled systems that define and automate one or more processes. Process automation systems typically operate "above" the level of industrial process control systems discussed above, and manage processes by managing the completion and status of a predefined sequence of steps. These systems automate processes traditionally performed by people, such as sales processing, supply procurement, and parts fabrication and assembly. They also provide inputs to computer controlled process automation systems that include dedicated systems to manage one or more aspects of manufacturing processes, such as metal fabrication or semiconductor manufacturing. However, PA systems often cannot control process automation systems due to the disparate nature of the two types of systems.

Traditional process automation systems typically permit users to define the process using a process definition language (e.g. PDL), the result of which is statically compiled and executed by the process automation system. These process definition languages are used to implement the automation of common business process workflows, such as the processing of orders, invoices or sales orders, and interfacing to external industrial automation systems in order to provide specifications for the manufacture of a particular part or system, or to order external services and parts needed to fulfill an order. Some traditional process automation systems may also manage process control systems, such as computer assisted manufacturing systems. For example, when a customer orders a part with specific colors, dimensions, or other physical attributes, the traditional process automation system may supply a computer assisted manufacturing system with specifications to manufacture that part, but does not actually manage the manufacturing processes.

Traditional process automation systems and process control technologies are often generally built on mutually exclusive technologies that generally cannot be combined. For example, one technology may provide ongoing synchronous monitoring and control for a rigidly defined process control "recipe," another asynchronously monitors progress through a workflow and provides step selection and status reporting. One technology may provide real time control process, another is a monitoring and step selection mechanism. Because of these differences, constructing a hybrid synchronous and asynchronous process management system is generally not a simple combination of the two (or more) technologies.

Traditional process automation systems often manage pre-defined workflows comprising one or more process blocks based upon instance variables and process block completion status. Generally, they compile the pre-defined workflow into a machine executable or interpretable state. Once a defined process workflow has been compiled, it is typically difficult or impossible to alter the compiled process without re-compiling the defined workflow (e.g. the BPEL) and restarting all currently executing workflow instances. This limits the flexibility of these systems in the face of unexpected process states, system outages, and/or partial system failures. These limits are often evidenced when workflows get "stuck" waiting for a resource that never becomes available, a change in process state that never occurs, or where processes simply "slow down" to unaccepted performance levels as their constituent process components are slowed.

Once set, the pre-defined workflow steps, paths, and decision points, and the computing resources assigned to implement them cannot automatically be changed in response to changing operational conditions. In particular, changes to the workflow cannot be made "on the fly" in response to real-time inputs such as supply interruptions, inaccuracies in underlying decision databases, or even in response to system and/or network errors. The workflow also cannot compensate for other operational issues that are not a failure, e.g. process slowdowns due to system overload or communication errors, nor can they utilize information such as systems performance measurements that might vary how the workflow executes once it is started. These limitations make the workflow definition complex and hard to change and test. Alternative mechanisms that eliminate this extensive alternative coding are needed.

There can also be issues with traditional process automation systems when interfacing with asynchronous external processes, process control systems, or other external systems that operate opaquely. In these cases, the traditional system-management approaches for availability and completion measurement fail. For example, if an external system response time slows, a traditional process automation system that measures process completion state cannot detect that the services provided by the external system are no longer performing in ways that permit the timely completion of the workflow. New methods to address these issues, including those that manage the external processes based upon on observed performance as well as reported status and completion codes, are needed.

In one particular example, defined workflows do not handle "out-of-band" failures or process conditions recognized after a workflow branching decision is made. Traditional process automation systems generally operate to block waiting upon completion of a workflow step. Sometimes, external conditions or a poorly designed workflow definition cause a workflow to "hang" waiting on an external event (e.g. completion) that never occurs, or occurs so late that the workflow does not complete in a timely manner. The "hung" workflow typically requires manual intervention to remove the cause of the hang. An example of this might be the processing of an order, in which the item to be picked is out of stock at the warehouse. When the warehouse again has the item required to complete the order, that item is picked and the order instance is completed. A process analyst could add logic to the workflow to check stocking levels in the warehouses and to pick a warehouse that has the item in stock. However, this approach does not address the case where a warehouse shows as having stock, but does not have the stock due to an administrative error, or where the warehouse is closed due to a transient event, such as a weather emergency. In both cases, either additional logic must be added to the workflow, or the workflow will hang waiting on the blocking condition to clear (e.g. stock to arrive or the warehouse to reopen). In these cases, an operator generally must intervene and reprocess/reassign the order. It would be useful to detect a blocked or hung workflow and dynamically redefine the workflow in a way that allows it to be completed without undue delay or operator intervention. What is needed is for the defined workflow to identify that a constituent process step has been "stuck" at a particular step for too long (without regard to cause), and if alternative approaches are available that permit the workflow to complete, to select one of those alternative approaches while the "out-of-band" problems are being resolved.

Similarly, once the source of failure has been resolved, traditional process automation systems do not gracefully fall back to the preferred workflows, as their workflow has been changed to accommodate the failure. Once a workflow has been changed, the process automation system can not fall back to the original workflow without manual intervention by an operator. This workflow processing limitation means that the system is not able to temporarily accommodate a failed or failing component and then recover to a preferred mode of processing once the failure is resolved.

Similarly, process control systems recognize and handle failures in the process by halting and alerting an operator to correct the failure condition. Empty machine input queues, lack of feedstock, or machine breakages create stoppages in the workflow that can only be cleared manually. It would be useful to enable a blocked or hung manufacturing process control system to automatically reroute the work around a failed (or stalled) machine and continue with manufacturing. Similarly, if a controlled process fails, it would be useful to allow the process control system to take corrective or remedial action in order to maintain production.

Traditionally defined process automation workflows and process automation recipes also are generally not scalable nor are they flexible in what hardware they are performed upon. Once a workflow has been defined and compiled, the execution of the workflow typically cannot be dynamically re-allocated to a different system while performing the workflow (as opposed to traditional load balancing techniques which run new instances of a workflow on different hardware). Once resources have been specified in a workflow, additional resources and new or changed process steps typically cannot be automatically removed or added, for example to maintain performance metrics. Similarly, a process control recipe cannot be automatically augmented mid batch to bring a manufacturing process back under control. This means that once a process falls out of control, there is no automated way to change the controlled process to bring it back into control. Thus, process automation recipes are often static and typically cannot be changed mid-run to incorporate recipe steps that compensate for an earlier failure, or to select an alternate recipe if a first recipe no longer meets operational requirements.

Existing traditional process automation systems generally do not operate in real-time, and have trouble operating using dynamically assigned or changing metrics. Similarly, they have challenges with providing the forward or predictive management of their workflow's operation in relation to those metrics. Specifically, a traditional process automation system executing predefined workflow instances cannot determine and implement real-time workflow changes to change the workflows based upon externally defined operational metrics.

What is needed is a control system that recognizes slow-downs in managed computer controlled and monitored processes and which dynamically reallocates resources to either complete the workflow within the parameters defined by one or more externally (to the workflow) defined metric(s), and that can reallocate aspects of the execution of some or all of the controlled system to alternative computer resources so the overall performance of the controlled system may improve. Similarly, a system is needed that can recognize process exceptions for industrial process automation causing process and metric exceptions and that can dynamically redefine the industrial process automation in order to automatically correct and/or recover from these process and metric exceptions.

Existing control systems executing defined workflows often lack a capability to predict bottlenecks in one or more parts of a workflow using metrics that are not hard coded into the workflow (e.g. metrics that are collected and managed outside the normal, predefined processing of the workflow) and to dynamically rescale or re-define system processing based upon predicted and/or detected processing bottlenecks. Similar features are needed for industrial process systems.

Overcoming problems with combining process automation and process control systems permits the construction of a single integrated control system, which may optimize its operation across both the process automation and process control domains. A new type of control system address the above shortcomings of computer managed process automation and process control systems.

To address these and other challenges, some embodiments herein provide methods of automatically dynamically managing and reconfiguring a Distributed Finite State Automata (DFSA) instance comprising: (a) using at least one computer, collecting statistics indicating state of performance of at least one part of the DFSA instance; (b) analyzing, with the at least one computer, the collected statistics in order to determine whether at least one key performance indicator metric will be met; and (c) conditioned on the analyzing, the at least one computer automatically dynamically reconfiguring either the structure, computing resources allocated to, or current stage of the DFSA instance to account for operational conditions with respect to the at least one key performance indicator metric.

The DFSA instance can comprise a finite state automata that defines a computer controlled manufacturing automation, shipping automation, electronic commerce workflow automation, or any other computer automated process.

The dynamic reconfiguring can provide process control operating range and capabilities and integrates process control monitoring and management, extends real-time operation and control to process handling, and provides real-time process control and monitoring.

The method can enable management of the DFSA instance to externally defined completion goals.

The method can provide dynamically determined process flexibility, extended operating range, and extended process recipe definition capabilities.

The method can provide enhanced error recovery and exception handling.

The method can include fulfilling one or more higher level goals dynamically associated with one or more DFSA instances.

The method can include meeting real-time changing operational constraints without requiring reprogramming or operator intervention.

A process automation system may comprise: at least one computer operationally coupled to a node instance, the computing device monitoring a executing DFSA instance associated with the node instance, the computer configured to automatically dynamically change the DFSA representation of the DFSA instance based at least in part on determining whether at least one key performance indicator will not be met.

The at least one node instance may comprise a computer paired with the DFSA instance.

The control system computer may enforce implementation of a manufacturing recipe.

The DFSA instance may comprise manufacturing, shipping, ecommerce, or any other process.

The control system computer may be further configured to dynamically change a workflow path.

The computer may be further configured to dynamically change the processing node assigned to implement workflow of the DFSA instance.

These and other aspects and advantages will become apparent when the Description below is read with the accompanying Drawings.

5. BRIEF DESCRIPTION OF THE DRAWINGS

These and other features and advantages will better be understood from a detailed description of example non-limiting embodiments selected for illustration and shown in the accompanying drawings, of which:

FIGS. 1A and 1B depict a non-limiting state machine defined by an exemplary DFSA definition, including additions and changes to the state machine based upon monitoring externally provided KPI-based metrics states are added.

6. DESCRIPTION OF EXAMPLE NON-LIMITING EMBODIMENTS

6.1 Overview

Figure 2:
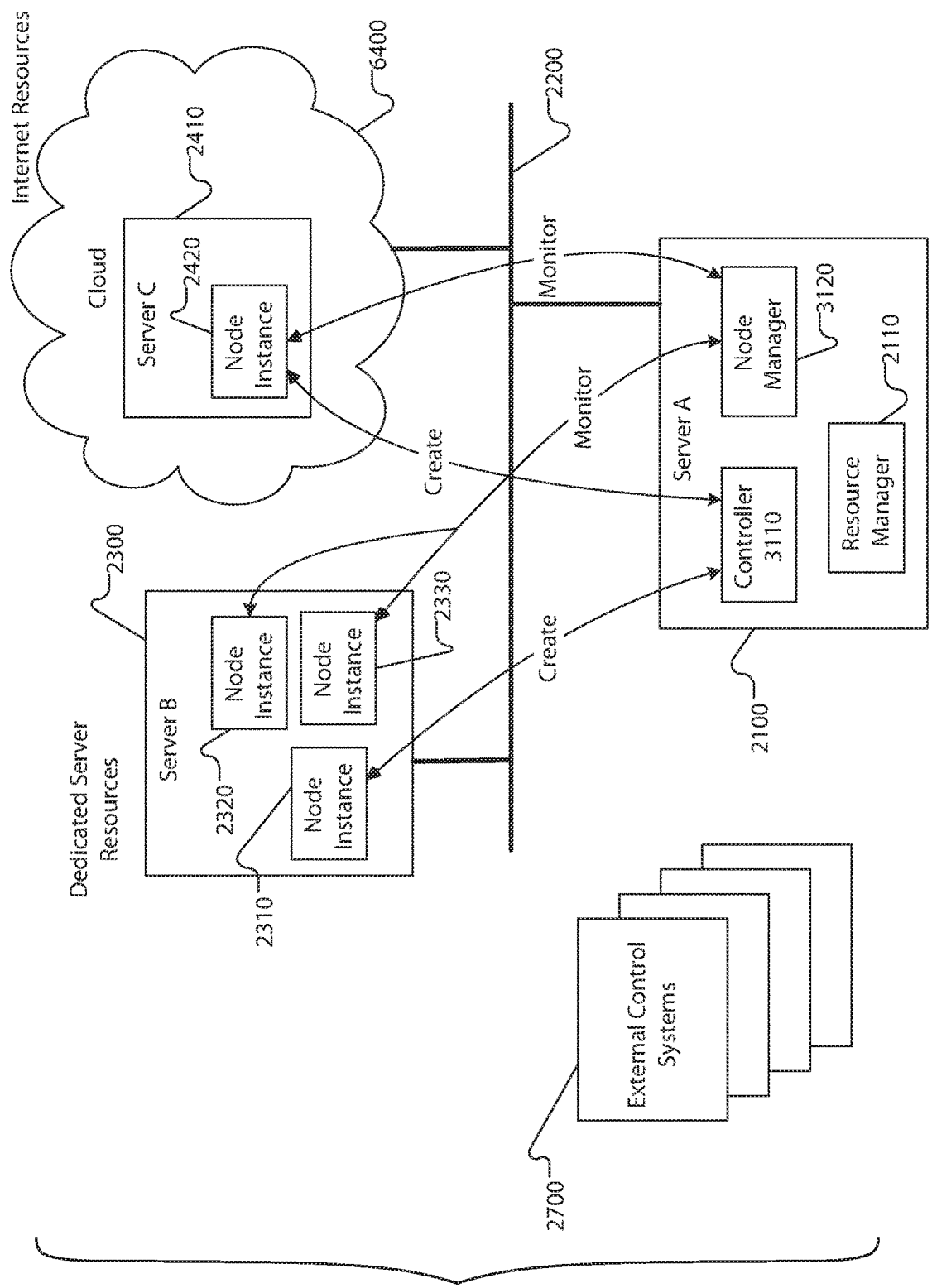
FIG. 2 depicts an exemplary schematic diagram of a non-limiting exemplary control system utilizing the described techniques for distributing real time workflow processing and management according to one aspect.

The systems and methods described herein provide a common system and method for managing manufacturing automation, business process flows, and external management-based KPI-based management systems as a single control system, which overcomes many of the long-standing problems caused by having disparate systems for each function. At a high level, this improvement is accomplished by converting and combining the functions of the disparate systems as finite state automata and recharacterizing their control and management operations as states and state transitions of a distributed finite state automata (DFSA). In this way, significant operational efficiencies are achieved and the resulting control system operates under simultaneous control in the process control, operational, and management scopes. Additionally, operational flexibility is improved because the redefined control system permits cross-computer distribution of each part of the FSA, e.g. without dependencies upon one or more computer systems, providing scalability and letting the control system optimize the overall performance and operation of the combined system.

In an example embodiment illustrated in FIG. 1A, the control system receives and translates existing workflow representations (e.g. BPEL from a process automation system) to one or more FSA representation. The FSA representation comprises definitions of specific operating states (State A, B, C, etc.), definition of state transitions between states (e.g. completion A, completion B), the computer programs to be executed by the control system while the FSA is in each specified operating state, and the conditions that cause/computer programs to execute for each of the defined state transitions in the FSA. Manufacturing automation systems may have their recipes similarly converted to FSA representation (not shown for clarity). Failure transitions, conditions, and states are also added (e.g. state Manual Recovery and the state transitions Error in Program A, etc.). Multiple FSA representations may be constructed and merged into a common FSA representation. As shown in FIG. 1B, external metric collection and monitoring systems KPI state definitions may be incorporated into the FSA by allocating KPI factors to one or more of the FSA states, associating a monitoring program and the allocated metric with those FSA states, and adding the monitoring and recovery transitions and states as FSA state and transition definitions. The resulting monitoring and recovery FSA aspects can then be merged into the common FSA representation, resulting in a unified FSA representation (as shown in FIG. 1B). The FSA representation may include specific computing hardware allocations, may specify classes of computing hardware for its execution, or may not specify specific hardware, relying on late binding of the computing hardware to the FSA at instantiation time. The resulting FSA definition may be stored in a database of the control system for subsequent use.

Upon instantiation, the FSA representation may be associated with specific computing hardware (e.g. portions of the FSA representation are assigned to specific computer systems and hardware). The resulting FSA representation (with hardware assignments) is called a distributed FSA (DFSA), and an executing version of a DFSA is called a DFSA instance. By separating the specification, assignment, provisioning, and instantiating steps, the resulting control system is made flexible so it may operate in a distributed environment. Distribution of control and automation execution supports distributed, unified control of facilities at different locations (e.g. a factory in New Jersey and a factory in California), the dynamic (e.g. during process control operations) reassignment of some or all of the computer controlled operations to different control computer systems, either due to control computer failure, or alternatively, on the basis of a currently measured operating statistic in comparison with a defined metric, as well as permitting the real-time identification and recovery of underperforming and/or failed portions of the DFSA on new computing hardware.

There are several methods that may be used to extract KPI-style metric specifications from KPI monitoring systems and allocate them to the states of an FSA. In an embodiment, one method is to convert the metrics to directed graphs that traverse the FSA states as graph nodes, using the directed graph to identify the portion of the KPI-based metrics contributed by each FSA state, and then encode the directed graph and any KPI-specific exception handling as a set of monitoring programs/control parameters associated with specific FSA states, adding additional FSA recovery states and adding a set of new state transitions based upon the KPI contribution of each state (e.g. transition to the recovery state when the monitoring program detects that the KPI contribution is out of bounds). For example, if a FSA has four states, and a KPI metric that specifies that the system must transition all four states in 1 minute, the system may assign the KPI to the four states equally, thus state A must be completed within 30 seconds of starting, state B must be completed within 30 seconds of starting and within 60 seconds total elapsed time, etc. Appropriate timers and monitoring programs are added to each of the DFSA states in order to monitor and, in the event of a timing overrun, cause a state transition to a recovery state. In another embodiment, the monitoring parameters may recalculate the projected KPI metric for the current DFSA instance based upon the KPI current or projected contribution of each state, and state transition to a recovery state when the projected KPI metric exceeds a specified limit (or operating range) or is approaching some predefined limit value. Once additional states, transitions, and monitoring are defined, these items are merged into the currently-being-converted FSA in order to produce a unified FSA definition as described above. Corrective actions for failure to meet KPI-based metrics may be encoded into the FSA definition (such as changing the state machine's state, collecting additional information, etc). Alternatively, the corrective action may be to run a program associated with the error state which performs a set of state-specific steps in order to determine the corrective action. In other embodiments, the corrective action may be to rewrite one or more states of the FSA definition and/or DFSA instance and then transition to a different state. Each of these approaches result in a combined FSA representation that can be written (or rewritten) to a system database each time it is changed. The write operation may be a rewrite-in-place (destroying the original copy), or it may be creating a new copy of the DFSA instance definition, which allows old copies to remain in the database for backup, historical review, and restoration of earlier system definitions.

In the event of a failure of one or more computer systems, processors, and/or programs running on the system and/or processor, a corrective action state may be entered that reallocates the DFSA definition and/or DFSA instance to one or more differing computer systems and/or processors. The reallocation step may include using the node resource provisioning process as performed by the provisioner service. Alternatively, the provisioning process may take place at a later time. In either case, the altered DFSA definitions, DFSA instance definitions, and/or FSA definitions may written to the system database as described above, and from there, be distributed to one or more processors that are operably connected, preferably over a network, where the programs that comprise the FSA state (and state transition) processing are executed.

It should be noted that the described control system may determine the programs, states, and transition actions to use each time the DFSA instance changes state by accessing the DFSA instance structure and computer (hardware) system assignments stored in the control system database. This permits an already executing DFSA instance to be modified on the fly, with the changes being adopted at the next state transition (e.g. automatically upon completion of a recovery state), overcoming the inherent problems with changes applied during operation inherent in prior systems.

These approaches result in an integrated distributed FSA (a DFSA) with automated metric monitoring and controls that improves process control operating range and capabilities, integrates process control monitoring and management with broader process automation management, and merges in the real time control of these processes to manage to external performance specifications (e.g. KPIs) without recoding the underlying process automation and/or process control programs and specifications. This results in the extension of real-time operation and control capabilities of the control system to include features of process workflows and extends process workflows by enabling real-time monitoring and process controls in accordance with externally defined metrics. In some cases, these metrics may be defined or redefined after a DFSA instance is generated, or even after a DFSA instance is deployed and is operating on the control system hardware, which may result in changes to control hardware and software usage. In such cases, the control system may require regenerating at least part of the DFSA definition. In some embodiments, the control system makes this change "in place," and in others, it requires remerging the FSA definitions with new metric-based FSA state definitions in order to create a new DFSA definition. In either case, the changed (or new) DFSA definition can be deployed in already running control environments without causing disruptions to that environment, taking effect the next time the state machine changes state. This flexibility provides new functionality with extended operating ranges and extended process recipe definition capabilities, and provides improved error recovery and exception handling, particularly with respect to the operation of the control system to control the system for both operational metrics and external performance metrics. The improved error recovery and exception handling allows the control system to continue to operate, even when errors are encountered, or when the system determines that important metrics are being missed (or, predictively, will be missed), by taking corrective action to change the operating state machine in order to improve its functioning.

The described systems and methods enable new modes of operation, which include operating the hybrid control systems with additional goals of fulfilling one or more higher level goals that may be dynamically changed associated after the basic control mechanisms are defined. This advance provides a significant advance in operation of both classes of control systems and permits the hybrid control system to operate in ways that fulfill a common goal or outcome. In particular, this combination enables the operating of both process automation and process control systems in new ways that let the systems meet real-time changing operational constraints without reprogramming and without requiring operator intervention.

These and other aspects and advantages will become apparent when the Description below is read with the accompanying Drawings.

6.2 Definitions

These definitions are used throughout, unless specifically indicated otherwise:

| TERM | DEFINITION |
| --- | --- |
| DFSA | Distributed Finite State Automata, comprising a set of states and state transitions implemented by one or more computer processors. |
| DSFA instance | A specific instance of a DFSA effective to process a particular workflow. |
| DFSA template | A specification or partial specification of a DFSA, including specifications for DFSA states, transitions, nodes, node templates, instancing specifications, and monitoring specifications. |

-continued

| TERM | DEFINITION |
| --- | --- |
| Node | A specification of a DFSA state, associated state transitions and actions, including specifications and parameterization specific workflow, and specifications and para.meterizations for compufing resources and the executable programs to be run by the specified computing resources in order to implement the DESA state processing defined by the node. |
| Node instance | An implementation of a node, associated with specific computing hardware and software effective to execute the specified programs that implement one or more states of a DFSA. |
| Node template | A specification or partial specification of a DFSA state, not including current state information or parameterization for a specific instance. |
| KPI | Key Process Indicator, a business metric by which the functioning of the system is measured (as opposed to a computing metric, such as memory, uptime, or number of CPU cycles used). |
| KPI-based directed graph | A directed graph of the DFSA states (nodes) based upon a metric associated with a specific KPI. |
| Workflow | A series of automated process steps managed by a workflow management system (e.g. an input to the described control system). |
| Recipe | A set of process steps and conditions managed by a manufacturing automation system (an input to the described control system). |
| Process Step | A step in a workflow or recipe (an input to the described control system). |

6.3 DFSA System and Network

Referring to FIG. 2, an exemplary, non-limiting embodiment of a control system utilizing the systems and techniques described herein for implementing a managed and distributed hybrid control system is shown in a schematic diagram view. The illustrated network comprises a cluster of three computing devices in communication over a network, including Server A (2100), which is described in more detail below in FIG. 3, a dedicated server resource (e.g. Server B (2300)), and internet resources (6400) including Server C (2410), which may include a cloud-based server such as those provided by Amazon AWS or Microsoft Azure. The servers A, B, and C may be provided as dedicated servers, virtual servers, or a combination of both dedicated and virtual server types, and may be locally or remotely located. Each may comprise a processor or plurality of processors, connected non-transitory storage storing instructions that the processor(s) execute, and communications interfaces. Additional servers may be added to or subtracted from the described computing cluster configuration as long as there is at least one server and processor that support the control services available to enable and manage the new functionality. Each of the servers (2100, 2300, and 2410) can be connected (i.e., in communication) with each other and with external systems (e.g. 2500, 2600, 2700 in FIG. 2 and FIG. 3) over a communication network (2200) using any known technology, such as a ring network, an Ethernet, a wireless network, wired or cable connections, or any other communications technology such as a wide area network or the internet, that may connect still other additional networks and devices (not shown) with the illustrated devices and vendors' systems as appreciated by those having skill in the art. The exemplary illustrative network architecture can include various network apparatus including cables, switches, routers, and network servers and workstations (not shown for clarity); and a firewall or other security mechanism (not shown). All physical components and devices described with respect to FIG. 2 are of standard construction, comprise at least a processor, memory, network interface, and software programs stored in the memory and executed by the processor in ways that customize the execution of the respective server processor in order to perform one or more aspects of a DFSA instance.

The program(s) of each server can be implemented using common programming languages, including, for example, PHP, Perl, Python, Ruby, JAVA, C++, and C#. In an exemplary, non-limiting embodiment, other servers, for example, Server B (2300) and Server C (2410) comprise LAMP servers or servers that provide substantially equivalent architecture and functionality.

The example server (2100) includes DFSA control and management programs called services. The services are programs stored in a memory of the server, and when executed by a processor of the server, convert the server into a DFSA processing and control system that can create, instantiate, monitor, and control one or more DFSA instances. The individual DFSA control and management services for creating, implementing, and managing one or more distributed finite state automata (DFSA) definitions and DFSA instances operating on distributed computer hardware. Multiple functions may be encoded within a single program; the functions are shown herein as separate service programs for clarity. The DFSA describes one or more functions for the unified specification and execution of process automation, process control, and control management to external metrics by providing state-specific processing nodes distributed among, instantiated, and running on one or more computing devices, such as, for example, Server A (2100), Server B (2300) and Server C (2140).

Each DFSA state-specific processing node comprises the customized and configured hardware and/or software to implement the processing for a specific DFSA state (or a set of specific DFSA states) and state monitoring and transitions. Such node instances can be implemented using one or more processors that execute instructions out of non-transitory memory, by a hardware implementation such as a gate array or application specific integrated circuit, or by a hybrid device that includes both hardware and software based processing.

External resources include computer controlled machinery, such as lathes, material handling systems such as dispensing, heating, and mixing systems (collectively process systems), additive printers, laser cutters, and similar industrial machinery. External resources may also include computers, networks, services, and network connected computer driven machinery operated by third parties, such as printing and labelling systems, scales, and the like. More particularly, external systems may include externally provided resources including third party automation systems (collectively, 2500, 2600, 2700 of various figures) such as, for example, order management systems, payment systems, shipping systems, and other external control systems as described above.

In addition to the constraints provided as part of the input process automation workflows and process recipes, constraints upon the operation of the control system may take the form of externally provided KPI's, which define a metric against which all or part of a DFSA instance is measured and controlled. For example, the metric may define the overall time a set of steps in a process control system may run, or the total elapsed time a DFSA instance may operate, and further define the information that must be collected for each DFSA instance execution. These KPI's may be stored in a system database or they may be stored in a KPI reporting system or other database (not shown) external to the described system.

Referring again to FIG. 2, Server A, B, and C each include components that may be used to implement one or more aspects of the DFSA instance. A DFSA instance comprises a DFSA definition, the allocation or assignment of the DFSA instance to one or more computing resources (e.g. a node instance), and the current processing state(s). A DFSA instance, or portion of a DFSA instance, or part of the system control services may be deployed to particular server of the system, e.g., Server A comprises the control services of a DFSA instance (e.g. services 2110, 3120), Server B comprises several node instances (2310, 2320, 2330), and Server C process comprises node instance (2420). The allocation of services and DFSA state and state transition programs may be dynamically determined on a DFSA instance by DFSA instance basis. Some or all of a DFSA instances (or parts of a plurality of DFSA instances) may be deployed on a single server, and managed by common or disparate DFSA management and control services. This distributed architecture permits the recovery of a DFSA instance (or parts of a DFSA instance) in case of server or communications failure as part of the overall management and control of one or more DFSA instances, which further allows the system to recover from a failure and manage and control each DFSA instance's compliance with the KPI-based metrics.

Each DFSA instance represents one or more parts of an automation control system that have been encoded as a distributed finite state automata (DFSA). Each DFSA instance component, e.g., node instances (3165), (2330), and (2420) and DFSA management and control services, includes one or more node programs and node program configurations installed and instantiated on a computing system, e,g. a server, a dedicated server resource, or an internet resource server.

A node instance is a resource that is managed by the control and management services. A node instance can include a program specification and parameterization specifications including input and output specifications, state change specifications, dependency specifications, and next and/or prior node specifications. An installed and instantiated node program interacts with one or more system and/or external resources, and may even interact with other node instances. The node instance provides data and instructions to, and collects data from these system and/or external resources according to a node template and DFSA instance specifications.

Server A further includes a controller service (3110), a node manager service (3120) and resource manager service (2110), which will be described later.

Figure 3:
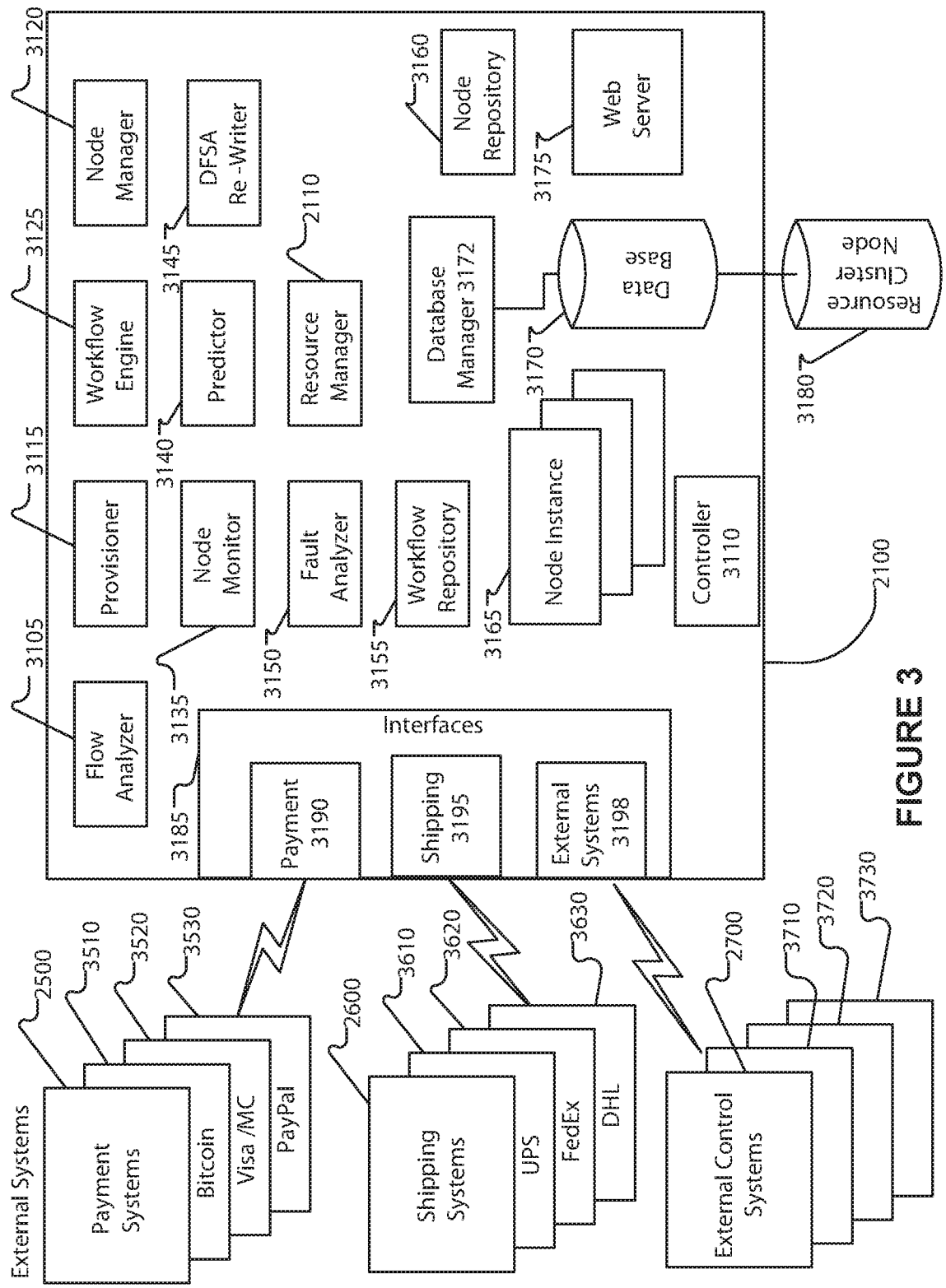
FIG. 3 depicts an exemplary schematic diagram of a non-limiting exemplary control system implementing real time workflow processing.

Referring to FIG. 3, an exemplary, non-limiting embodiment including a server (2100) is shown in a schematic diagram view. Computing devices used to host a server can run any operating system that supports the features required to implement the server. A server instance makes use of existing operating system services, device drivers or language support libraries to interact with device hardware, such as network interfaces, in some devices where said services, device drivers or language support libraries implement required functionality for use by a server.

The server further comprises at least one communication interface module (3185) that provides a mechanism for converting data to signals compatible with one or more devices operably connected to the network (2200) and in communication with the server. Communication interface module includes interfaces to the external systems, including payment interface (3190), shipping interface (3195), and external systems interface (3198), each interface configured to let the control system be in communication with one or more external systems (collectively 2500, 2600, and 2700 of FIG. 2 and FIG. 3). The communication interface module may implement wired- or wireless communications protocols. A non-limiting example of a wired communications protocol is TCP/IP, operating over Ethernet. A non-limiting example of a wireless protocol is TCP/IP over 802.11g. In one exemplary, illustrative, non-limiting implementation, the selection and management of the communication interface is made under the control of the device operating system.

In a first exemplary embodiment, the server includes a collection of software components instantiated on a conventional data processing system such as a computer system of known manufacture that possesses the required resources (e.g. memory, storage, CPU, network interfaces) that is in communication using traditional means (e.g. network connectivity). Example data processing systems include computer servers, desktop, and laptop computers running a variety of operating systems. In an exemplary, non-limiting embodiment, each server or collection of servers operating as a cluster is implemented as a computer server, which includes a number of software components, including a core operating system, a web server (3175), a database storage (3170), and specific node computer programs executed by the processor of the server. A server can be implemented using any combination of operating system, web server, database, and programming language suitable for implementing the server functions. A server OS may include one of a Linux operating system, Windows OS, OSX, Solaris, or any other operating system capable of supporting server functions. The web server component may comprise a general HTTP server such as Apache, IIS, Cherokee, Lighttpd, and Nginx. Database storage component (3170) is a data store utilized by the database management system (3172) to store information. A database management system component may comprise an SQL-based database such as those provided commercially by Oracle, Informix, Microsoft, and MySQL, although alternative non-SQL-based databases such as MongoDB may be utilized. It typically is a disk subsystem implemented as part of the server, although any storage means in communication with the server (such as SAN or NAS) may be utilized. Database and/or database manager can exchange data with resource cluster node (3180) which represents a cluster of web servers, including one or more of database, file, and messaging servers that can provide services to a server.

Services provided by one or more server(s) of the system include a node repository (3160) in which node information is stored in the form of node templates. Node templates are uniquely identified, independent structures that define one or more aspects of a node including a node program specification that defines the computer programs that are included in the node instance, resources used, configuration options and parameters, and performance metrics, including monitoring and implementing state transitions based upon specific external KPIs, associated with the node.

A workflow repository (3155) includes a data store (or alternatively, database) of one or more workflow and recipe templates, which are used by the workflow engine to create one or more DFSA template(s). Workflow templates and recipe templates include definitions of process steps for a business or manufacturing process such as a manufacturing process. A workflow template may be defined in a well-known format, such as BPEL.

The system may provide a user interface (not shown) to the workflow repository that permits a user to create, edit, select for instancing, and otherwise manage the workflow templates. Additionally, the system may provide an API interface that permits other systems to programmatically access the workflow repository and create, edit, select for instancing, and similarly manage workflow templates.

A workflow engine service (3125) selects and converts workflows and recipes, first by selecting and obtaining a workflow template from a workflow repository, then converting the workflow template to a DFSA template and then saving this defined set of DFSA nodes as a DFSA template in the system database. The output of the workflow engine is depicted in Figures IA, 1B, showing an example workflow being converted to a state machine representation. Alternatively, the newly created DFSA template may be passed directly to a provisioner (3115) for instantiation. DFSA templates are specifications for a distributed finite state automata, without binding to a specific processor or machine, which defines one or more DFSA states and the state transitions (both conditions, actions) between these DFSA states.

A provisioner service (3115) creates and executes (e.g. instantiates) one or more DFSA instances (3165) corresponding to the specification of one or more DFSA templates. Typically, each part of a DFSA template is implemented within an individual DFSA instance. In some embodiments, a subset of the DFSA template is made part of a DFSA instance. In an embodiment, the provisioner service obtains, from the node repository (3160), node templates for each of the DFSA instance defined node instances and uses the node template to configure one or more node instances corresponding the states of a DFSA instance. In alternative embodiments, the provisioner service directly configures the node instances from the DFSA instance specifications. The provisioner service also selects one (or more) computer systems/processors to be configured to execute the node instances for the DFSA instance, obtains the specified programs and configuration information associated for the node instances, and, if necessary, installs these programs and configurations on the computer system(s) that includes the selected processor(s), and then causes the selected processor(s) to execute the node instance programs as part of instantiating a DFSA instance. The provisioner service initiates and configures a corresponding node instance for each of the DFSA instance states, and manages the initial operation of the DFSA instance, for example by implementing parameters specified for the DFSA instance, e.g. parameters specified by a DFSA template and/or by a node template, and starts and stops each node instance in accordance with the specifications defined by the DFSA instance.

The provisioner service further initiates and configures monitoring and control services associated with node instances of the DFSA instance, including installing and instantiating monitoring and control service instances as required. The provisioner also configures (as needed) the monitoring and control services of the control system (e.g. node monitor service (3135) or controller service (3110)) and associates the node instances with the monitoring and control services of the control system so the node instances are controlled and monitored in accordance with the appropriate metrics.

The resource manager service (2110) provides services that manage the availability of computing hardware resources and of operating monitoring and control services of the system. It monitors and manages for availability the hardware resources, as well as the availability of a monitoring and control service to monitor and control DFSA instances. It instructs the provisioner service as required to instantiate additional monitoring and control services as needed.

A fault analyzer service (3150) determines whether one or more node instances, programs, or servers are malfunctioning, and if so, communicates with the provisioner and DFSA re-writer services to change the configuration of the DFSA instance and/or specification of the DFSA template.

Node instances instantiated and executing on the servers monitor one or more external systems (e.g. 2500, 2600, 2700), including external application resources, and collect data related to these systems and resources including performance metrics and actual level of services. Each server includes one or more interface modules (3185) through which node instances and other services operating on the server can communicate with external systems to send and receive data. For example, the server can include one or more payment interface node instance(s) (3190) that sends messages to and receives message from external payment systems (2500); for example, specific external systems operated by Bitcoin (3510), PayPal (3530), and credit card providers (3520), e.g., Visa, MasterCard, American Express. Similarly, the system can include one or more shipping interface node instance(s) (3195) for communicating with external shipping systems (2600) including sending shipping instructions and queries to and receiving shipping information from external systems, e.g., updates on shipping status with, for example, external systems operated by UPS (3610), FedEx (3620), and DHL (3630). Received information is passed on to one or more node instances (3165). Communications between a server and external systems (e.g. 2500, 2600, 2700) can be carried out using standard communication protocols including email, SMS, web service, SOAP, and REST. The elapsed and round trip time of these communications, as well as their contents, may be used in conjunction with the metrics to determine of an external system (and/or the communications between the control system and the external system) are performing within specification.

A node monitor service (3135) operating on the server collects node instance operating metrics including data relating to node instance contributions to KPIs and measurements of node instance performance. Node instances also may report performance metrics of monitored external resources to the node monitor service. Reported external service metrics can indicate, for example, an ability of an external service to process a request in a timely manner. Reported node metrics can indicate, for example, a capability of a node instance to complete in a timely manner. The node monitor optionally writes the collected performance metrics to the system database associated with one or more the node instance, node template, DFSA instance, and the DFSA template.

A node manager service (3120) manages the node instances while they are executing and records operating statistics of the node instances, which can include measured or reported external system metrics and node instance metrics. In addition, the node manager service monitors and collects information from interfaces to external systems (e.g. 3190, 3195) in the same manner. The node manager service compares the collecting statistics against one or more metrics to determine if the node instance is performance within the required metrics. If it determines that the node instance is performing outside the allocated metric, it may generate a state transition or call one of the other monitoring and control services in order to determine the corrective action to take.

A flow analyzer service (3105) analyzes DFSA templates and DFSA instance definitions for operational dependencies, bottlenecks, and for distribution and parallelization opportunities, and provides input to the DFSA re-writer service in order to update the DFSA templates, DFSA instance specifications, and node templates.

A predictor service (3140) receives inputs from the flow analyzer (3105) and from the node monitor (3135), and combines and analyzes the received inputs to predict out of metric performance and potential performance bottlenecks in DFSA instance operation. The flow analyzer analyzes the DFSA instance definition to determine if the performance bottleneck can be bypassed by rewriting the DFSA instance definition. When a performance bottleneck is detected, the predictor service can initiate actions to correct or mitigate the performance bottleneck. It can instruct the provisioner (3115) to reconfigure or re-start a node instance or a plurality of node instances and/or DFSA instances. Additionally, the predictor can instruct the DFSA re-writer (3145) to re-write portions of either or both the stored DFSA template and the definitions of operating DFSA instances to avoid using one or more node instances and/or resources, or to instantiate additional node instances in order to bypass system overload conditions.

A DFSA re-writer service (3145) rewrites DFSA templates and DFSA instance definitions based upon predicted and actual processing bottlenecks, as well as failed or failing node instances and computing resources.

The system further comprises a fault analyzer service (3150). The fault analyzer service receives inputs indicative of node instance performance from the node monitor (3135) and from other system components. The fault analyzer analyzes these received inputs to determine incorrect or unexpected functioning of one or more system components including node instances (3165, 2320, 2420, etc.) and servers, e.g., Server B (2300) and Server C (2410). Inputs that indicate incorrect or unexpected functioning can include loss of communication with a node instance or server, failure of a node instance to report data within a specified time period, performance parameters that are outside the historical range of prior node instance operation, and other indicators that a node instance or server is not functioning or is not functioning as expected. When a fault is detected, the fault analyzer service can initiate actions to correct or mitigate the fault. The fault analyzer can instruct the provisioner (3115) to reconfigure or re-start a faulty node instance or a plurality of node instances and/or DFSA instances. Additionally, the fault analyzer can instruct the DFSA re-writer (3145) to re-write portions of either or both the stored DFSA template and the definitions of operating DFSA instances to avoid using a faulty server and/or resource, or to instantiate additional node instances to perform functions previously performed by faulty node instances.

Collectively, the DFSA instance and computing components necessary to implement a DFSA instance that controls an external system are called a controller server.

For example, an initial workflow includes steps for arranging shipping a newly manufactured part through the UPS carrier system (3610). During execution of the DFSA instance corresponding to the combined workflow, one or more node instances (3165) gather performance statistics from UPS external service (3610) through shipping interface (3195). Each of the node instances (3165) report the gathered UPS service (3610) performance statistics to the node manager service (3120) which records the statistics and reports them to the node monitor service (3135). The predictor service (3140) receives the performance statistics from the node monitor service (3135) and performs an analysis using the measured performance statistics applied to workflow analysis results provided to the predictor service (3140) by the flow analyzer service (3105). The results of the analysis performed by the predictor service (3140) indicate that a bottleneck is predicted with the UPS shipper service (3610) or with the node communicating with the UPS shipper service. In another exemplary use case, the results of an analysis of the performance statistics indicates that a bottleneck has already occurred. In either case, when performance statistics indicate that a bottleneck will occur or has occurred and is related to shipping through the UPS service, the DFSA re-writer service (3145) adjusts the current (and other affected) DFSA instance definition(s) to include states that implement shipping through an alternative service and to remove states associated with the original shipping service: for example, shipping through the FedEx service (3620).

In another example, a DFSA instance's definition that includes shipping a product from a first facility can be re-written to ship the product through an alternative facility if a bottleneck is predicted for products shipped from the first store. The re-written DFSA instance definition is used to reconfigure the specifications applied to existing node instances and to select and instantiate additional node instances as previously described.

The re-written DFSA instance is implemented without requiring a recompile and without requiring the DFSA instance to be restarted.

All of the above control system services are illustrated as operating on Server A, but may be installed on any computing device of the control system. Multiple instances of each service may be included without deviating from the scope of the disclosure.

6.4 Operational Metrics

Example system DFSA instances are performance measured by a monitoring and control system. These metrics include node instance execution time and measurements of the resources used. Metrics are automatically rolled up and reported for groups of one or more node instances (both within a DFSA instance, and horizontally across similar node instances of multiple DFSA instances) and are similarly automatically rolled up for DFSA instances, providing valuable insights into node instance performance and failures, DFSA instance performance and failures, and overall performance of the system. For example, if a target metric is that 95% of the orders complete a DFSA instance within 15 minutes, the controller service (3110) which manages DFSA instances (and the selection of node instances within the DFSA instance) in accordance with target metrics may be utilized to ensure that the DFSA instance(s) complete within the managed operational metric.

Table 1 lists some operational metrics that may be used by an example system to manage one or more DFSA instances:

TABLE 1

| Metric | Typical measurement | Comments |
| --- | --- | --- |
| Wallclock time | Seconds | Amount of time (wallclock) spent executing this DFSA instance or node instance |
| Execution time | Seconds | Amount of time (process) spent executing this DFSA instance or node instance |
| Execution resource count | Unit count | Counter of PA resource(s) used by this DFSA instance or node instance. |
| Node instance failure count | Unit count | Counter of failures of this NSA instance or node instance. |
| Cost | $ | Dollar cost of the DFSA instance or node instance |
| CPU load | Idle time percentage | |
| Memory consumption | Memory usage (MB) and/or Free memory (MB) | |
| Power consumption | Kw/hr | |
| CPU process count | Unit count | |
| Average data transfer | Mb/sec | |
| Peak data transfer | Mb/sec | |

Each process definition also may be associated with one or more high level metrics (called KPIs), which define metrics that the system accumulates and reports upon. The 95% target metric given above is an example of one such KPI.

The selection of KPIs for a defined DFSA instance automatically defines one or more metrics that the system measures and rolls up for each of the defined node instances. Additional measuring programs may be allocated to a node instance (or DFSA instance) in order to measure the externally defined KPI metric for that node instance. For example, the assignment of a KPI for shipped sales will cause the system to add a program to calculate the dollar amount of each sales order line item actually shipped to the node instance definition and to configure that program to report the result of that calculation as data for use in the management and control by the DFSA instance. Alternatively, the assignment of a KPI for order processing time will cause the control system to measure and accumulate wallclock processing time, or to add a program to one or more node instances to calculate the wallclock processing time associated with the particular node instance(s). The wallclock timer may be configured to cause a state change or notify a monitoring and control program if the wallclock time exceeds a specific, KPI-specified or KPI-derived limit. The automatic assignment, program allocation, and collection of metrics based upon KPIs permit substantial simplification of the system encoding while improving the amount and types of information collected by the system.

Figure 4:
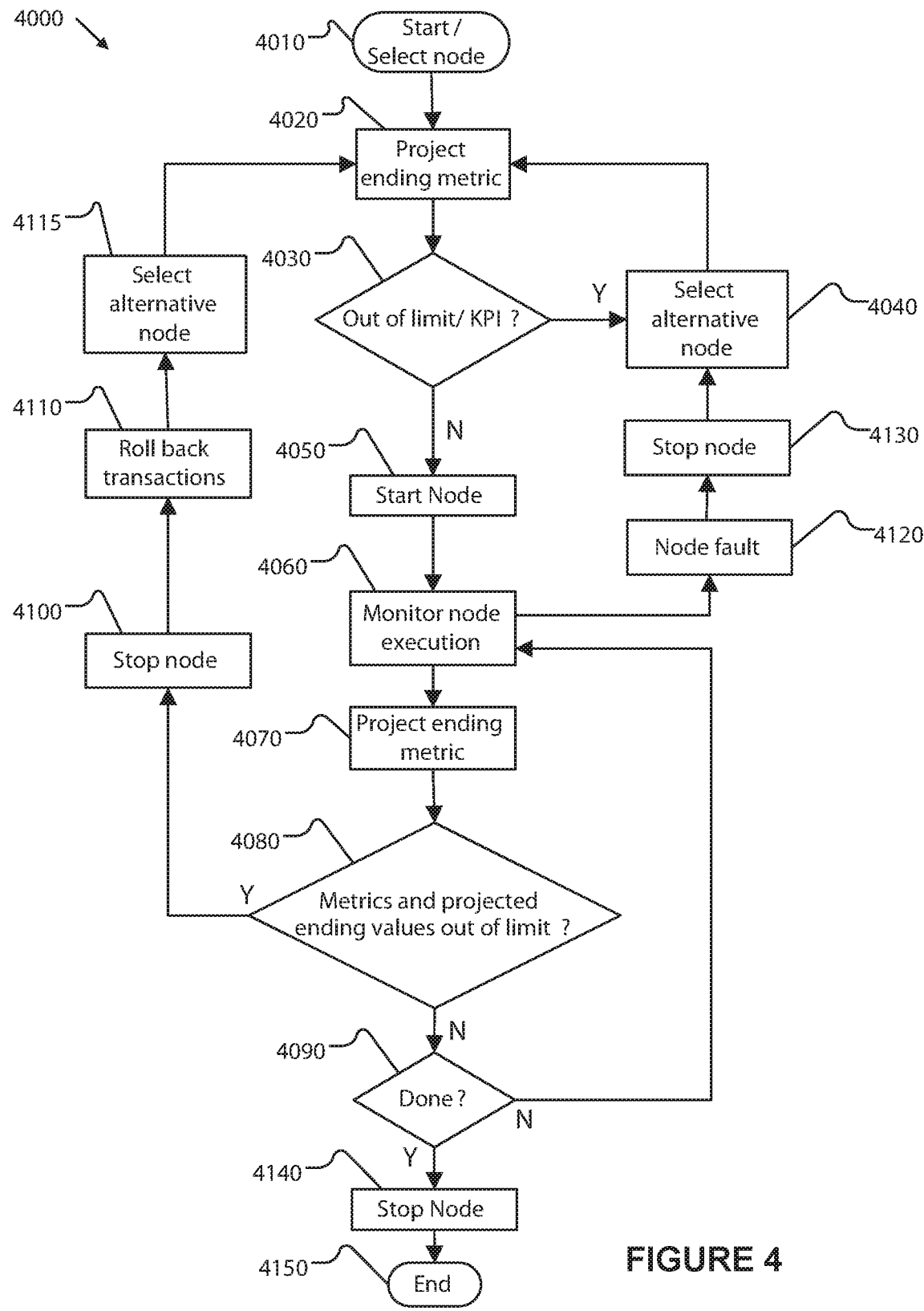
FIG. 4 depicts an exemplary flow diagram of a non-limiting exemplary of a controller process for selecting, monitoring, and managing nodes in conformance with KPI metric parameters.

An exemplary method by which a DFSA instance is executed by the system is illustrated in FIG. 4. In an embodiment, the method is implemented by programs that are distributed among various node instances of the DFSA instance. In another embodiment, a controller service (3110) implements this general method to manage the implementation of DFSA instances in order to ensure that KPIs are met, and the node instances report information to the controller service. The management and control method is presented herein as a single control method implemented by a controller service for purposes of clarity. Notwithstanding this presentation, each step of the management and control method may be implemented in a distributed manner as part of a DFSA instance state (e.g. a node instance) and/or state transition, or as part of one or more monitoring and control services (e.g. controller service 3110) of the control system.

The monitoring and control method (4000) includes the provisioning of, and selecting node instances to use, and projecting expected node and DFSA instance ending metrics before a node instance (or DFSA instance) is run, or while the node instance is running, and deciding whether to select an alternative, peered, node instance based on evaluating the projected metrics against node instance limits, DFSA instance limits, and the limits of the KPIs assigned. Note that the method describes a specific steps that are performed by one or more services of the control system.

The monitoring and control method begins with a decision to select and run a DFSA instance (4010). The system projects one or more ending metrics (4020) associated with the node instance(s) of the DFSA instance by calculating ending values of the metrics expected if the selected node instance are run (using the expected node instance operating parameters). The projected metrics are evaluated (4030) to determine whether one or more of the projected metrics exceeds one or more limits or KPIs. One method of calculating these projected metrics is by traversing a directed graph of nodes and summing their expected contribution to the KPI value, and then comparing the resulting total with the KPI limit. If the limits are not exceeded, the selected node instance(s) are started (4050).

If the selected node instance is determined to cause (or is expected to cause) an out of limit condition and one or more alternative node instances are available, an alternative node instance is selected (using services described above) (4040) and metrics using the alternative node instance are projected (4020). This process may repeat until a satisfactory node instance is selected and started. The alternate node instance may include one that causes the DFSA instance to be within the limits, or alternatively, causes the DFSA instance to violate fewer of the limits than the original selected node instance.

Once a node instance is started (4050), the system continuously monitors execution of the node instance (4060). If, while the node instance is executing, a node instance fault or failure is detected (4120), execution of the node instance is halted (4130). A node instance fault can occur if the node instance fails to execute properly or stops executing all together. A node instance fault can also occur if a communication link with an external system, such as a monitored external system, is lost or if a failure of the external system is detected, for example if the external system fails to provide data or provides unexpected data. If a node instance fault occurs, an alternative node instance is selected (4040). The controller process returns to the project ending metrics (4020) step for the selected alternative process.

While the system monitoring process is executing, metrics are periodically computed and updated as part of the process. Each executing node instance reports metrics collected by that node instance to the controller service (3110) which aggregates newly collected metrics data with previously stored metrics data. The system also periodically updates projected ending values (4070) of the DFSA and node instance metrics by calculating expected ending metrics based on the monitoring results. The metrics and projected ending values of the metrics are evaluated to determine whether one or more limits or KPIs have been or is predicted to be exceeded (4080). If none of the metrics or projected ending values are out of limit, the system iterates monitoring until a determination is made that the DFSA instance and node instance is complete (4090) at which point the instance is stopped (4140) and the monitoring and control method ends (4150).

If one or more metrics or projected ending values exceed a limit or KPI, i.e. if the DFSA instance is operating outside of limit boundaries, the node instance is stopped (4100) and any transactions or partial transactions are rolled back (4110). If one or more alternative node instances are available, the system selects one or more new node instance(s) (4115), starts those node instance(s), and the management process loops back to calculating and evaluating metrics (4020) of the executing node instance(s) and DFSA instance(s).

Figure 5:
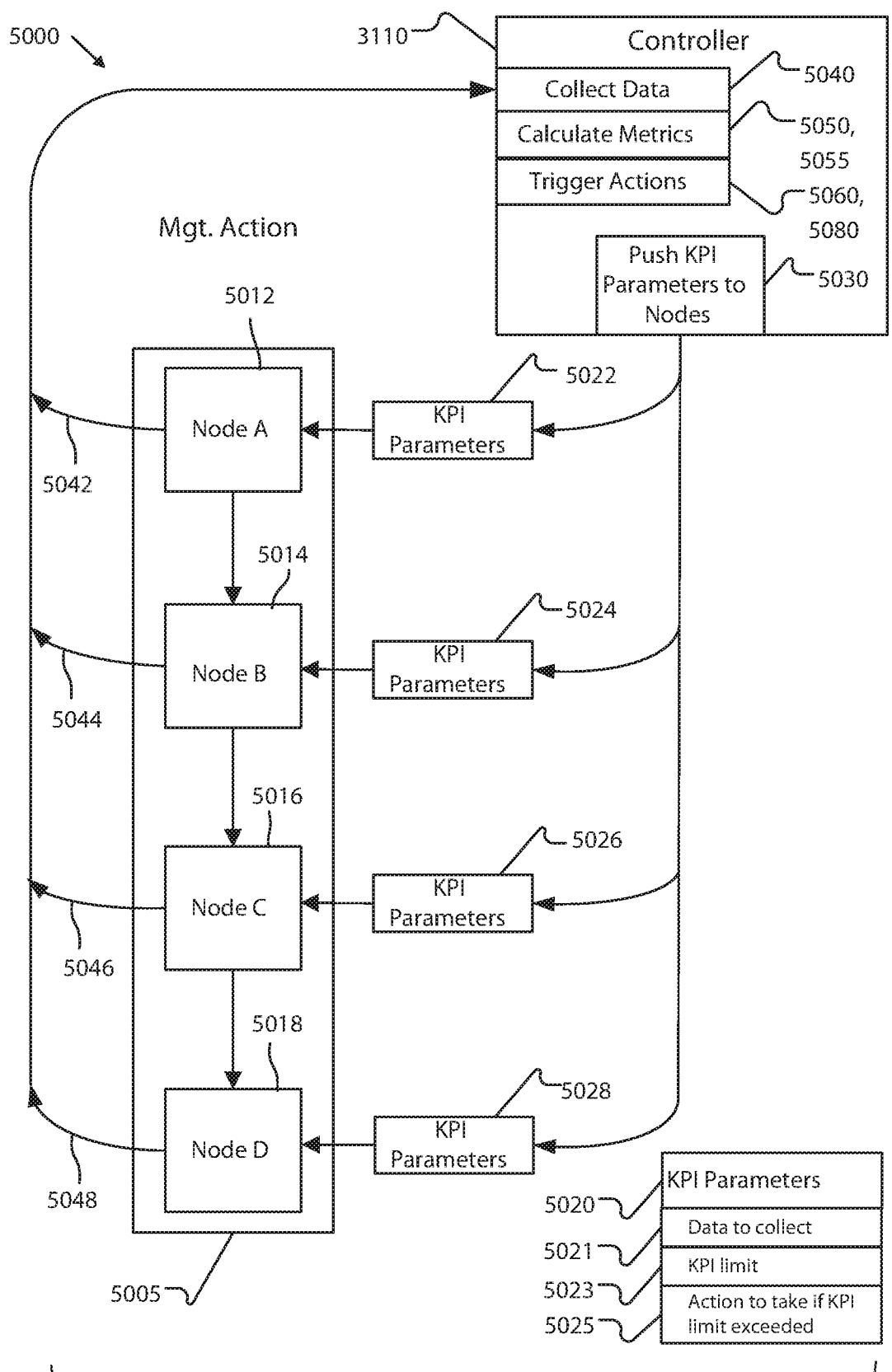
FIG. 5 depicts an exemplary schematic diagram of a non-limiting exemplary execution of a process for automatic assignment of KPI-based metrics and the automatically defined rollups of these metrics.
Figure 6:
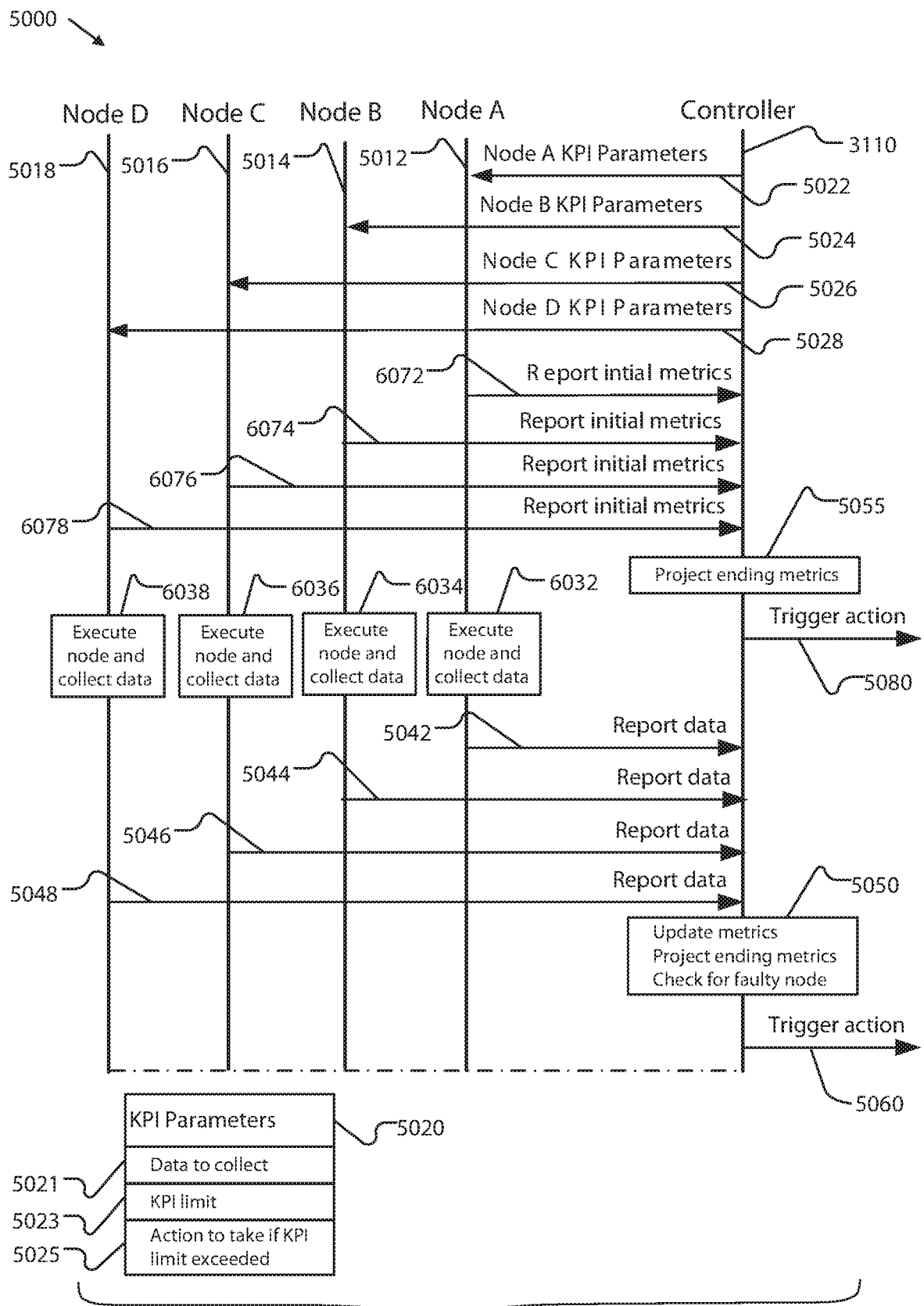
FIG. 6 depicts an exemplary schematic diagram of a non-limiting exemplary execution of a process for automatic assignment of KPI-based metrics and the automatically defined rollups of these metrics.

FIGS. 5 and 6 illustrate an example of automatic assignment of KPI-based metrics to specific node instances, and the automatically defined rollups of these metrics to the DFSA instance and KPI level. The automatic assignment and collection of KPI-based metrics represented by FIGS. 5 and 6 can be performed by the system implementing a process such as example monitoring and control method (4000). An exemplary DFSA instance (5005) includes four sequential node instances represented by node instances A (5012), B (5014), C (5016), and D (5018).

KPI parameters (5020) include definitions of the Data to Collect (5021), which specifies data that a particular node instance is to collect, and KPI limit (5023), i.e. a numerical value defining an acceptable limit to the specified KPI data that is to be collected, and Action to Take (5025) which specifies one or more actions to be undertaken if a KPI limit is exceeded. KPI parameters (5020) can also include parameters that specify delivery of collected KPI data to the controller service (3110), for example specifying that data is sent periodically to the controller service by one or more node instances or that data is sent by one or more node instances in response to periodic polling requests from the controller service.

The controller service (3110) pushes Data to Collect (5021) KPI parameters to nodes instances (5012, 5014, 5016, and 5018) to configure them, while KPI limit (5023) and Action to Take (5025) KPI parameters are used to configure the controller service.

In exemplary metric assignment and rollup process (5000), the controller service pushes (in step (5030)), a node-specific set of KPI parameters (5022, 5024, 5026, 5028) to each node instance (5012, 5014, 5016, 5018). In an alternative exemplary metric assignment and rollup, KPI parameters are pushed to a sub-set of selected node instances, configuring the selected node instances to collect and report data. Non-selected node instances, e.g. those not receiving pushed KPI parameters, do not collect and report data. The pushed KPI parameters include at least a specification of the data each node instance is to collect and report. Data collected and reported by a node instance can include performance statistics of monitored external resources and performance metrics related to performance of the node instance itself. Each node instance can be configured with different KPI parameters which depend on the monitored external resources and node functionality corresponding to each node instance. KPI parameters (5022, 5024, 5026, and 5028) pushed to node instances also may include data reporting settings including method and frequency of data reporting.

While implementing an exemplary operating method, e.g., the methods of monitoring and control method (4000), prior to starting the execution of a DFSA instance (5005) or prior to the execution of each node instance while stepping through the DFSA instance, node instances (5012, 5014,

5016, 5018) report initial KPI parameters (6072, 6074, 6076, 6078) to the controller service (3110) for use by the controller service in projecting ending KPIs metrics (5055) (e.g., metrics projected after the DFSA instance completion, and at the end of the workflow). If a projected KPI metric exceeds a KPI limit (5023) defined by KPI parameters (5020), controller service, instead of starting a node, triggers an action (5080), such as selecting an alternative node or process. Alternatively, the controller service may start creating a new set of node instances that "recover" the DFSA instance. These calculations and recovery mechanisms may also be performed by process automation systems with respect to process automation recipes.

If projected ending KPIs are not out of limit, node instances (5012, 5014, 5016, and 5018) begin execution of the node instances according to DFSA instance (5005). The node instances each execute, perform monitoring functions for which they have been configured, and collect corresponding data (6032, 6034, 6036, and 6038). Collected data includes KPI metrics of monitored external resources and performance metrics related to the performance of the node instances and monitoring functions are carried out.

Node instances (5012, 5014, 5016, and 5018) report collected data (5042, 5044, 5046, and 5048) to controller service (3110). Collected data reported to the controller service includes KPI metrics and node performance metrics, which collects the reported KPI metrics and performance information (5040) and uses the collected data to update DFSA instance and system metrics (5050). The controller service updates current node instance and overall DFSA instance KPI metrics, projects node and workflow ending KPI, and can recognize one or more faulty nodes based on the collected data reported by the node instances.

The controller service (3110) can trigger one or more actions (e.g. state transition, or a call to service of the control system) (5060) based on the updated metrics. For example, the controller service can trigger an action if an individual node is found to not be meeting a KPI limit, an individual node is projected to not meet a KPI limit, or the overall process is projected to not meet a KPI limit. The controller service also can trigger an action if an individual node instance malfunctions; for example if incorrect or unexpected functioning of a node instance (5012, 5014, 5016, and 5018) is detected. Actions triggered can include stopping an out of limit or faulty node, rolling back transactions, selecting an alternative node such as a predefined peered process or node, reordering processing between DFSA instances, providing additional computing resources or process resources, restarting or reconfiguring a faulty node instance or a plurality of node instances, restarting or reconfiguring a DFSA instance, re-writing workflow to avoid a faulty server or resources, and instantiating additional nodes to perform functions previously performed by faulty nodes.

The automated identification, collection, and reporting of KPI-based process metrics enable several additional improvements to a traditional system. First, the improvements allow the improved system to project expected node instance metrics for one or more node instances, which permits forward calculation of system DFSA instance metrics. When used with node instance execution times, the improved system can estimate completion time for a DFSA instance before all of the node instances are completed (or even before some node instances are started). This predictive capability allows the management of node instances to ensure the node instances and DFSA instances complete within a defined or proscribed period of time, or within another defined process metric. Second, these improvements permit the system to collect information that supports an automated determination whether each DFSA instance is operating "normally" (e.g. operating within normal operational parameters as measured by collected metrics—in "control" in a classic Deming process control usage). This additional determination of DFSA instance status may be applied at any level of the process, from individual node instance metrics thru DFSA instance KPIs. If a DFSA instance is identified as having one or more node instances deviating from normal operation status, corrective actions may be identified and taken automatically by the system, or the DFSA instance may be identified for manual review and corrective action by an operator. When combined with the predictive capabilities described above, this enables powerful new functionality of these types of systems.

A third further improvement is that the automated identification, collection, reporting of KPI-based metrics, and the automated determination of operating state permit the identification of DFSA instances that may be projected to not meet one or more KPI metrics. For example, if a DFSA instance completion was delayed due to a problem with slow communications with one or more external providers, each node instance may individually operate within "normal" parameters, but the overall process may be outside of the defined KPI for that process. The rollup of actual and expected node instance times and determining whether a DFSA instance will complete within a defined KPI is an important improvement to systems.

These improvements enable a system to real-time manage a plurality of DFSA instances so KPIs are met. In a first example, the system identifies, during the processing of one or more DFSA instances, a DFSA instance that will not complete within a defined KPI. In a first example of operation, the system reorders the processing between DFSA instances to prioritize the delayed DFSA instance so it completes on time. In a second example of operations, the system may also provide additional computing resources or process resources to the prioritized DFSA instance to facilitate its completion within the defined metric(s). In a third example, the system determines additional node instances that may be used in place of a failing node instance(s), and changes the definition of the existing workflow or recipe template, DFSA template, node template, and/or DFSA instance definition to use the newly determined additional node instance(s) (in lieu of, or in addition to one or more of the existing defined node instance(s)).

Traditional PA process definitions permit a user to define alternative process steps in the event a predetermined failure mode is identified. Conditions such as out of stock, empty feedstock tanks, and the like may be accommodated if preconfigured within a BPEL definition. Unfortunately, these conditions tend to increase geometrically as the BPEL increases in complexity. New mechanisms for determining alternative BPEL steps are needed that do not require a redesign, recompile and redeployment of traditional PA BPEL to allow an alternate processing to occur. A new system that can be changed dynamically without requiring recompiling and redeployment of new or changed BPEL would add significant value.

An aspect of the control system extends existing systems by defining "peer" operations. A peer operation comprises one or more node instances with equivalent effect to another set of one or more node instances. In essence, peered operations form two parallel FSA fragments, either of which may be used to achieve a desired outcome. For clarity and exemplary purposes, the peering example is illustrated as a workflow with peered branches, but may be implemented as part of a DFSA instance or as a managed external system by the control system. In the exemplary description, these peered operations may have differing process steps, process step ordering, costs, execution times, etc. A simplistic example of a "peer" operation may be found in shipping, with different shipping methods being considered "peers." A shipping process step using UPS could be considered a peer to with a shipping process step using FedEx. Here, costs and promised delivery times may vary for these two peered process step examples. The selection of a shipping method based upon cost and promised delivery time is well understood and is routinely encoded within process automations today. What is not addressed today is the definition of alternative peer processes, the establishment of metrics that define "normal" operation of these peered processes, and mechanisms for identifying conditions under which the system should use a peered process instead of the primary process, and mechanisms for the automated selection of a peered process steps to use in place of a set of primary process steps.

Figure 7:
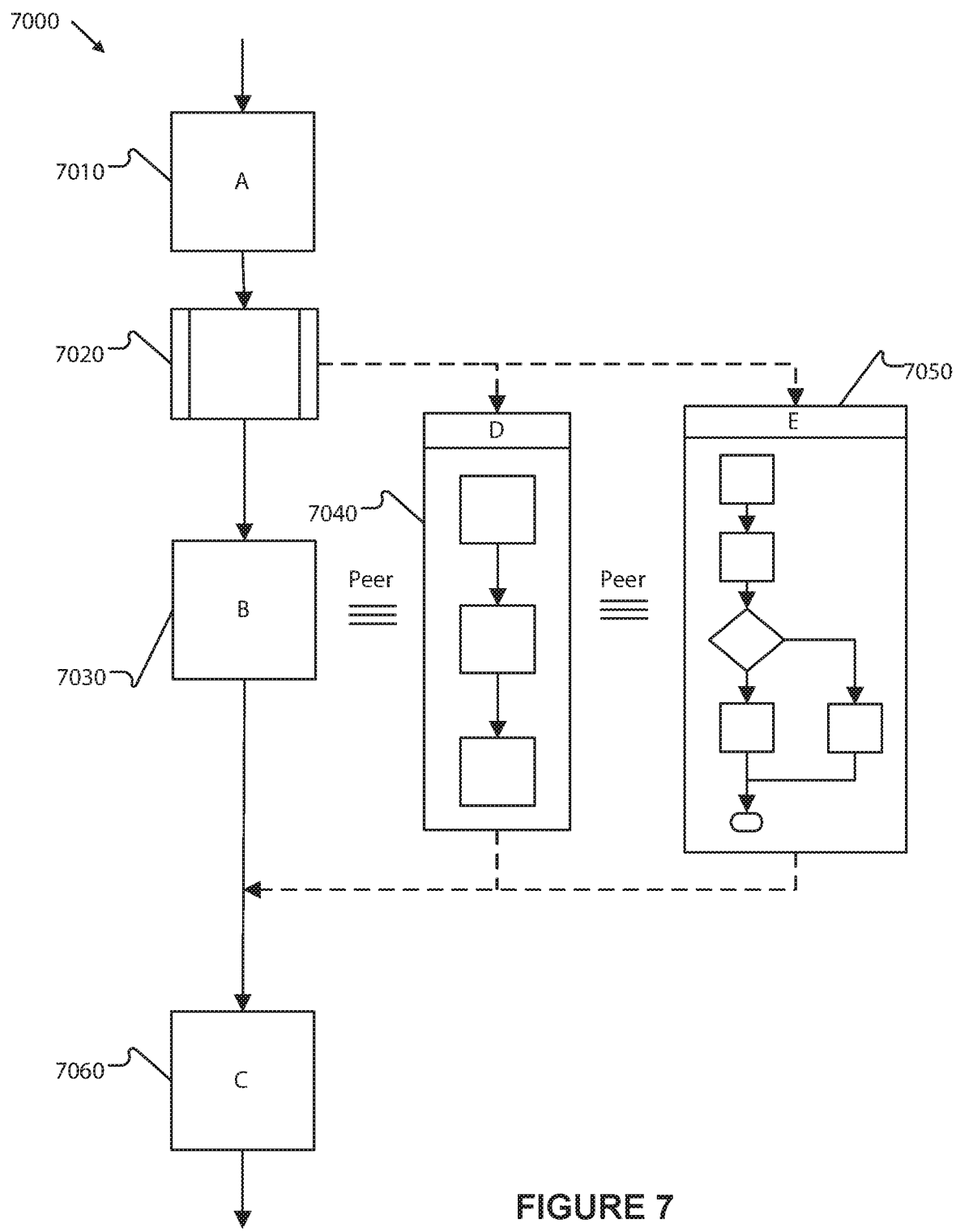
FIG. 7 depicts an exemplary schematic diagram of a non-limiting exemplary improved process workflow.

An illustrative example of a DFSA instance (7000) including "peered" node instances are shown in FIG. 7. The process represented by a simplified state machine that includes three sequential node instances, represented by Node A (7010), Node B (7030), and Node C (7060). The DFSA instance also defines Node D (7040) and Node E (7050), both of which are peered to Node B (7030). At step (7020), the control system executes the instance corresponding to Node B (7030) or it can execute an alternative node instance that is peered to Node B, i.e. either an instance associated with Node D (7040) or Node E (7050). Peered Nodes B, D, and E can each include different node instances or process step structures (if part of a process automation system controlled by the control system). Each structure can include multiple node instances, as represented by exemplary process steps structures of Node D (7040) and Node E (7050).

A peered set of node instances may have its own unique FSA definition, or it may be encoded within a larger DFSA instance (or template) definition. In either method of encoding, the start and end of each set of node instances is identified, and metrics to collect are automatically assigned to each set of peered node instances. Sometimes costs may be assigned to each set of node instances. In the above shipping example, the peered node instances for shipping using FedEx and UPS will have different costs and delivery times assigned to them, and may have different executable programs for communicating with the external systems for FedEx and UPS respectively. These costs and expected times may be encoded within the DFSA instance (or template) definition, obtained from a metrics database managed by the system, or may be obtained from an interface to an external system. The initial selection of a shipping method on the basis of cost and delivery time is well known (typically selecting the cheapest cost that meets the customer defined shipping requirement [e.g. overnight]); what sets the system apart is that a second selection may be made when the system makes the determination that one or more KPIs will not be met, or that one or more of the node instance(s) is performing outside of its normal range of operating values. In one example non-limiting embodiment, all the underlying node instances can be "reconfigured" into a new "alternate" DFSA instance definition that resolves the bottleneck or failed KPI. This "reconfiguration" can happen on the fly via the user interface or via "machine learning/AI" algorithms.

In an example, a combined manufacturing control system and order management system including a shipping interface is described. The manufacturing portion of the control system takes input order parameters and manufacturing recipe and manufactures a trade good customized to the order parameters, while the shipping portion provides process automation for pack and shipping via an external shipping vendor. UPS and FedEx shipping systems are both represented as external interface node instances, in which a program in the system is configured to interface to each respective shippers external system (e.g. instances of an external system). Here, two different programs are used, one for UPS and one for FedEx. The shipper specific node instance comprises, at minimum, the program required to transmit shipping requests to a shipping vendor's online interface, receive confirmation information, and determine and report communications failures and response time. Other features may be added to this interface software without deviation from the design. The system collects metrics and status information on each of these programs, including the number of shipments dispatched to a specific shipping vendor, the time required to place the order, the communications status between the system and the external system, etc.

The control system has several KPIs defined for it, including order processing time (time it takes for the order process to be fully manufactured and processed by combined management and control system), expected delivery date, communications status and status change information, and time it takes to complete the transaction of placing an order.

In a first example, the system selects the node instance for communication with the external system of a first shipping vendor (e.g. UPS), instantiates it, and after monitoring its performance, determines that the external interface process is running slow, with average time to complete a shipping request being more than twice normal. In other embodiments, the node instance examines the communications with the external system and determines that the shipment would not be delivered in time. In either case, the delay will cause a KPI for order processing time (or end to end order to delivery time) to be exceeded, so the system automatically selects and instantiates a node instance for the interface to the external system of a peered shipper (e.g. FedEx) despite the higher cost of using FedEx over UPS.

In a second example, the system selects a first shipping vendor (e.g. FedEx) and determines through the external interface that FedEx may not be able to honoring their delivery terms due to current shipping volumes (such as that which occurs during holiday shipping periods). Again, this could predictively cause the KPI for order delivery time to be exceeded, so the control system automatically selects and instantiates a node instance for the interface to a peered shipper (e.g. UPS) that can still make the delivery in time.

In a third example, the system selects and instantiates a node instance for the interface to the external system of a first shipping vendor (e.g. FedEx) and determines through the external interface (unrelated to FedEx) that a major snowstorm is affecting Memphis.

Historically, snow events in Memphis cause FedEx to miss delivery commitments, and would be projected to cause the KPI for order delivery time to be exceeded, so the system automatically selects and instantiates a node instance for interface to the external system of a peered shipper (e.g. UPS) that can deliver in time.

In the fourth example, the system selects and instantiates a node instance for the interface to the external system of a first shipping vendor (e.g. UPS) and determines that their interface process is running slow, with average time to complete an order being more than twice normal. It is historically noted that slow processing by the external interface is correlated to missed delivery KPIs, so the system automatically selects and instantiates a node instance for the interface to the external system of a peered shipper (e.g. FedEx) whose systems are running properly.

The combination of dynamic selection of peered node instances and forward prediction of metrics permits many new features of systems, and includes a substantial reduction in the complexity of process definitions, greater consistency of DFSA instance execution statistics, and the real-time management of DFSA instances to defined metrics and KPIs.

The example non-limiting technology includes improvements to general computerized processing performing machines, and includes several illustrative examples of how the improvements described improve the functioning of the system.

6.5 Examples

These Examples are provided to illustrate certain aspects and to aid those of skill in the art in the art in making and using the technology.

Title: Goal Seeking Process Engine Management of Process Automation

In a first non-limiting example implementation, the control system is implemented for improving the automation of a manufacturing process at a manufacturing facility, which is external to the system. The external manufacturing facility includes an API to enable communication with the system. The manufacturing process automation is implemented by the API and by components of a controller service (3110). External systems (2700) include an external computer interface to a manufacturing facility (3710). The server communicates with the manufacturing facility in order to exchange information with and provide control instructions to manufacturing automation systems located at the manufacturing facility via external systems interface (3198).

Figure 8:
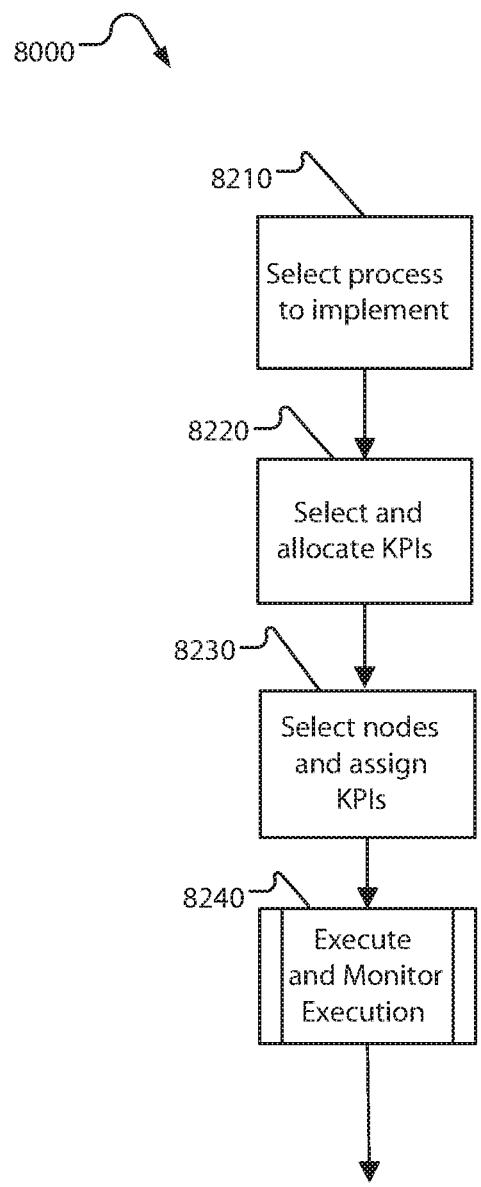
FIG. 8 depicts an exemplary simplified process flow by which a system implements and monitors a DFSA instance.

FIG. 8 illustrates an example simplified process (8000) by which the system implements and monitors a DFSA instance. Process (8000) starts with the system selecting a DFSA template to implement (8210). The system next selects one or more KPIs to apply to the DFSA template and allocates each KPI to at least one node instance in the DFSA template (8220). The DFSA instance definition is then generated, and node instances (and corresponding node instance computer programs and the computing resources to be used) are selected and provisioned, and the KPIs are assigned to the node instances (8230). The DFSA instance and its node instances are executed and monitored (8240) until the DFSA instance is complete (e.g. has reached a terminal state). KPI can be assigned and node instance (and DFSA instance) performance can be monitored using a KPI assignment and metric rollup process (5000).

Figure 9:
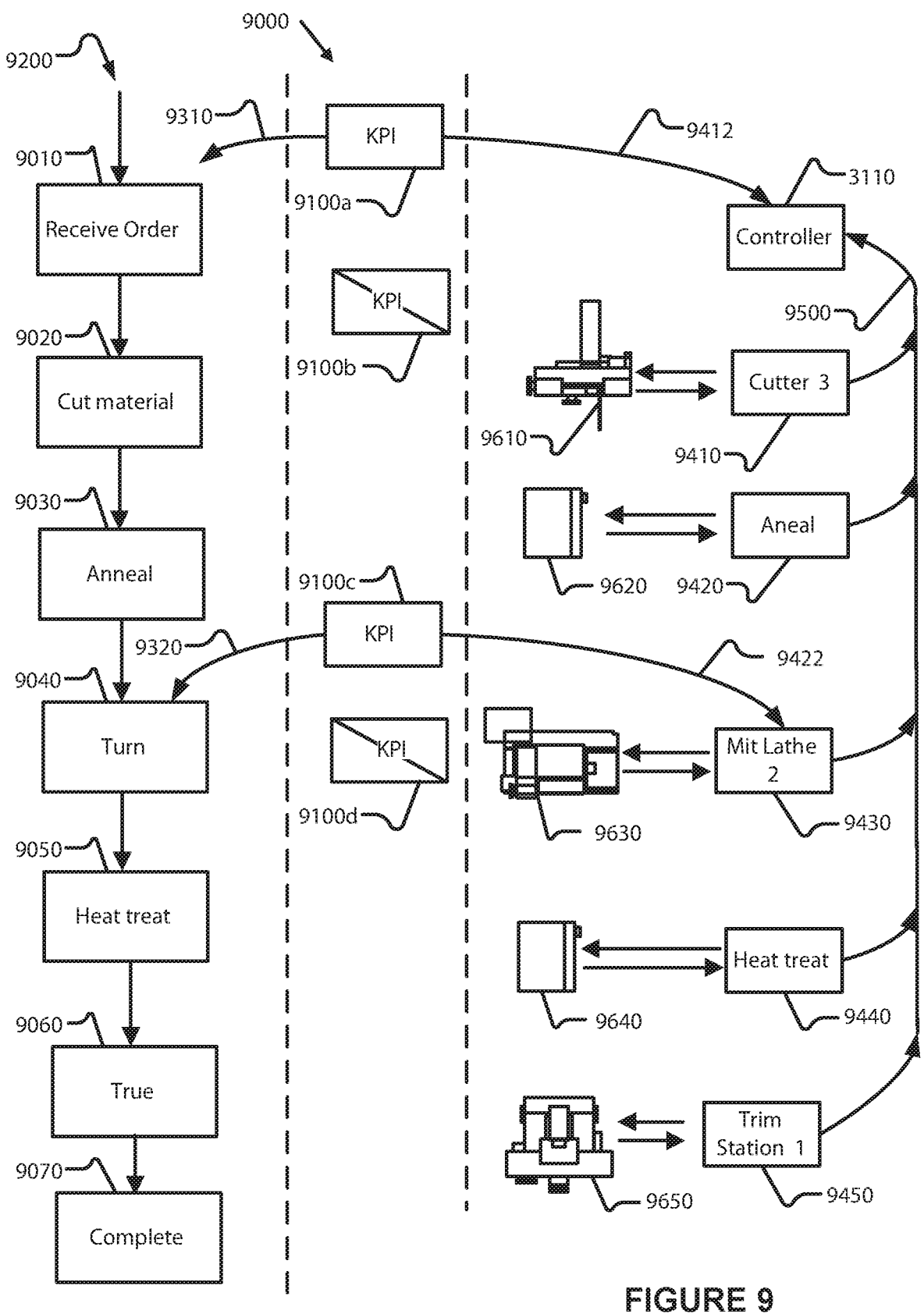
FIG. 9 depicts an exemplary schematic diagram of an example control system flow and exemplary simplified implementation for managing a non-limiting automated manufacturing process in accordance with external KPI metrics.

FIG. 9 illustrates the example workflow encoding an example manufacturing process (9200) and a simplified implementation of the workflow (9000) by the system. The system is implementing the manufacturing process (9200), using a process definition of seven steps, comprising a first step of receiving an order (9010), a second step of cutting stock material to size (9020), a third step of annealing the cut material (9030), a fourth step of turning the annealed material on a lathe to form a turned workpiece (9040), a fifth step of heat treating the turned work piece (9050), sixth step of trueing the workpiece (9060), and a final step of marking the order complete (9070). The manufacturing process is constructed as a set of DFSA instances using node definitions as defined below.

The manufacturing process (9200) can be associated with a set of KPIs, one or more of which the system can select and allocate to the manufacturing process (8210). Here, the KPIs include a first KPI (9100a) and a second KPI (9100b), both of which are for overall part processing time. The first KPI (9100a) is for a high priority order and includes overall part processing time of 5 hours and part cost of $30. The second KPI (9100b) is for a normal priority order and includes overall part processing time of 2 days and part cost of $12. The KPIs also include a third KPI (9100c) and a fourth KPI (9100d), both of which are for turning time. Turning time represents an amount of time it takes to turn a part on a lathe in the Turn process step (9040), which for manufacturing process (9200) is a rate limiting step. The third KPI (9100c) is for a high priority order and includes turning time of 10 minutes and part cost of $15. The fourth KPI (9100d) is for a normal priority order and includes turning time of 30 minutes and part cost of $4.

| KPI | Priority | Elapsed time | Cost |
|---|---|---|---|
| Part processing time (9100a) | High | 5 hours | $30 |
| Part processing time (9100b) | Normal | 2 days | $12 |
| Turning time (9100c) | High | 10 min | $15 |
| Turning time (9100d) | Normal | 30 min | $4 |

As shown in FIG. 9, the manufacturing process (9200) is selected (8210) for management and execution by the system. The system manages the manufacturing process in accordance with a set of dynamically configurable node instances (9410, 9420, 9430, 9440, and 9450) each associated with a process step (9020, 9030, 9040, 9050, and 9060) of manufacturing process (9200). The overall process (9200) and the Turn process step (9040) are associated with KPIs. After the process is selected (8210), the step of selecting the relevant KPIs from the available KPIs is performed (8220) and the selected KPIs are allocated to specific one or more process steps and assigned to one or more DFSA instances instantiated when the process step is executed.

In this example, KPIs are selected for use when implementing manufacturing process (9200) based on whether a received order is a high priority order or a normal priority order. In alternative implementations, KPIs can be selected based on minimizing part cost or another time or resource-based goal. In the example implementation (9000), the order is a high priority order. The high priority overall order time KPI (9100a) is selected and allocated (9310) to the overall manufacturing process (9200). The high priority turning time KPI (9100c) is selected and allocated (9320) to the Turn step (9040). The low priority KPIs (9100b, 9100d) are not selected and are not used to manage the automation process.

Once KPIs are allocated to the manufacturing process (9200), the nodes and associated processing resources to be used when the process is executed are selected. Selecting processing resources includes selecting each processing resource (e.g. server, processor, storage) and selecting the portions of the DFSA instance to be instantiated on a controller server, e.g., controller service (3110). Processing resources are assigned as needed and available, and as their historical and current process metrics relate to the KPI requirements defined above.

The node selection step may include searching the node repository (3160) to find available nodes, and associated processing resources (collectively node instances), that could be used and then selecting, from the pool of available nodes definition, specific node definitions to use when process (9200) is implemented. The control system uses the provisioner service (3115) to search node repository (3160) for node templates that specify node instances matching the specified Turn KPI parameter (9100c). In this case, the controller service manages the overall process KPI (9100a).

The control system searches the node repository for templates that specify node instances to which a turning time KPI (9100c) can be assigned. The system finds multiple lathe templates, each associated with one of two types of lathes, either a Mitsubishi 9-axis lathe or a Haas 7-axis lathe. Each lathe template includes turning time among a list of KPIs that can be assigned to a lathe management program instance specified by the lathe template. Each lathe template associated with a different lathe that can turn a workpiece is associated with historical KPI data for that lathe, i.e. machine performance data is saved associated with the template during a previous execution of a DFSA instance based upon that template, and other information that can be used by the system for making node selection such as, for example, machine specifications, machining tolerance capabilities of the lathe, machining processes the lathe is capable of performing, and process time for specific machining operations that can be performed by the lathe.

When implementing the manufacturing process (9200), the system notes the receive order step (9010) time as its starting time for the use with the total part processing time KPI (9100a). The system also calculates and choses process steps and node selections that permit the overall process to complete within the allocated KPIs. As part of this setup process, the system obtains the historical metrics for the candidate process steps and nodes, and then begins a process of goal seeking to identify a solution, eliminating from consideration those steps and nodes that do not support the process completion within all the KPIs.

In this example, the system uses a node selection process, such as described in the monitoring and control method (4000), to determine which of the lathe node templates to select and instantiate, i.e. which lathe resource to select for use in Turn step (9040). In this example, historical data, listed in the table below, for elapsed time and cost can be used to select from among the possible choices. The system evaluates historical KPI data stored associated with the templates and that the Mitsubishi lathes, and not the Haas lathes, are capable of meeting the high priority turning time KPI (9100c). The system compares historical per-part turn time for each of the Mitsubishi lathes, determines that both lathes are projected to be capable of meeting the 10 min turn time KPI and selects Mitsubishi lathe 2 (9630) because it has historically performed faster than Mitsubishi lathe 1.

| Node | Budge-per-part turn time | Historical per-part turn time | Budget per-part cost | Historical per-part cost |
|---|---|---|---|---|
| Mitsubishi lathe 1 | 10.0 | 10.0 | $15.00 | $15.00 |
| Mitsubishi lathe 2 | 10.0 | 9.0 | $15.00 | $13.50 |
| Haas lathe 1 | 30.0 | 28.0 | $ 4.00 | $ 3.75 |
| Haas lathe 2 | 30.0 | 25.0 | $ 4.00 | $ 2.25 |
| Haas lathe 3 | 30.0 | 30.0 | $ 4.00 | $ 4.00 |
| Haas lathe 3 | 30.0 | 28.0 | $ 4.00 | $ 3.35 |

The system can use additional criteria for determining which lathe to select. In an alternative example, the system discovers during a search of the template store that two Mitsubishi lathes are potentially usable to fulfill a high priority order and determines that Mitsubishi lathe 2 (9630) is preferable due to the faster historical per-part turning speed stored in historical data. However, the system determines that Mitsubishi lathe 2 (9630) is offline, e.g. for maintenance such as changing a dull bit. The system skips the offline lathe for use while executing Turn process step (9040).

The system can select from multiple resources that are usable to manage node instances to which no KPI has been allotted. In this example, the manufacturing facility (3710) includes multiple cutting machines that can fulfill the cut material step (9020). The system can select a cutting machine to use based on machine availability and can use additional criteria, such as material (e.g., 316 stainless vs. hardened machine steel) that each cutting machine is capable of cutting or stock size that each machine is preconfigured to cut when selecting. In this example, cutting machine 3 (9610) is selected because it is available and is already configured to cut the material required for fulfillment of manufacturing process (9200).

After determining what resources to assign the nodes, the system instantiates each node instance and monitors the node execution, and makes adjustments as needed (8240). When the system executes turn process step (9040), provisioner (3115) will instantiate the node template (or predefined node instances) associated with Mitsubishi lathe 2 (9630) in order to provision the node instance specified by the Mitsubishi lathe 2 template, i.e. node Mit Lathe 2 (9430). Node Mit lathe 2 (9430) communicates with the actual Mitsubishi Lathe 2 (9630) to send instructions to, receive status, and receive KPI and other operation-related data from the lathe. When the system executes Cut material process step (9020), provisioner (3115) will instantiate the node template associated with cutting machine 3 (9610) and install, instantiate, and provision the associated node instance, node Cutter 3 (9410). When other node instances (9030, 9050, 9060) are required, the control system will install and instantiate an associated node instance capable of communicating with and collecting performance data from a resource associated with each instance including Anneal node instance (9420) associated controlling the annealing equipment (9620) used to fulfill Anneal step (9030), Heat Treat node instance (9440) associated with the heat treatment equipment (9640), e.g. a high temperature oven, used to fulfill Heat Treat step (9050), and a Trim Station node instance (9450) associated with a trimming station (9650) used to fulfill True step (9060). Each instantiated node instance (9410 through 9450) can communicate with associated manufacturing equipment (9610 through 9650) provide configuration parameters to the equipment, and monitor and control the hardware of the manufacturing equipment. For example, Mit Lathe 2 node (9430) can configure Mitsubishi Lathe 2 (9630) with tool path information to configure the lathe for Turn step (9040).

The system uses an automated KPI assignment and rollup process, for example process (5000), to assign KPI metrics to installed and instantiated Mil Lathe 2 node instance (9430) and to roll up KPI-related data collected by each of the node instances (9401 through 9450). The turn time KPI (9100c) is assigned (9422) to the Mit Lathe 2 node (9430). The overall part processing KPI (9100a) is assigned (9412) to the controller service. Mit Lathe 2 node (9430) communicates with Mitsubishi lathe 2 (9630) to receive data related to assigned KPI (9100c) and overall KPI (9100a). Other installed and instantiated nodes (9410, 9420, 9440, and 9450) communicate with associated manufacturing resources (9610, 9620, 9640, and 9650) to receive data related to the overall KPI (9100a). The nodes communicate (9500) collected KPI data to a controller service. The overall part processing time KPI (9100a) is assigned to the controller service, which uses data received from nodes (9410 through 9450) to track and manage the overall process (9200).

In a first monitoring process example, the system monitors the execution of the Turn process step (9040) and determines that, after 15 minutes, the process step has not completed. The system determines that the part processing time KPI (9100c) has been exceeded, optionally alters a system administrator, and optionally takes back the order and reassigns it to Mitsubishi lathe 1.

In a second monitoring process example, the system monitors the overall part processing KPI (9100a) and determines that the high priority order will not be completed in time. The system optionally alerts a system administrator and optionally takes back the order and reassigns it to another manufacturing line at the manufacturing facility (3710) or to another manufacturing facility at a different site.

Title: Goal Seeking Process Engine Management of an Automated Order/on Demand Manufacturing System In a second non-limiting example implementation, the system is implemented for improving the automation of an additive manufacturing process at a 3D printed part supplier firm that includes multiple part printing shop locations, each shop location including multiple 3D part printers having differing resolution and material capabilities. The 3D printed part supplier firm is external to the system. The external 3D printed part printing locations each include an API to enable communication with the system. The additive manufacturing process automation is implemented by the API and by components of a controller service (3110). External systems (2700) include 3D printed part supplier (3720), which includes multiple part printing shops. A controller server communicates with the 3D printing part supplier (3720) and constituent part printing shops to exchange information with and provide control instructions to 3D printing systems located at the part printing shops via external systems interface (3198). A server (2100) also communicates with external vendors such as shipping vendors (3610, 3620, and 3630) via shipping communication interface (3195).

Figure 10:
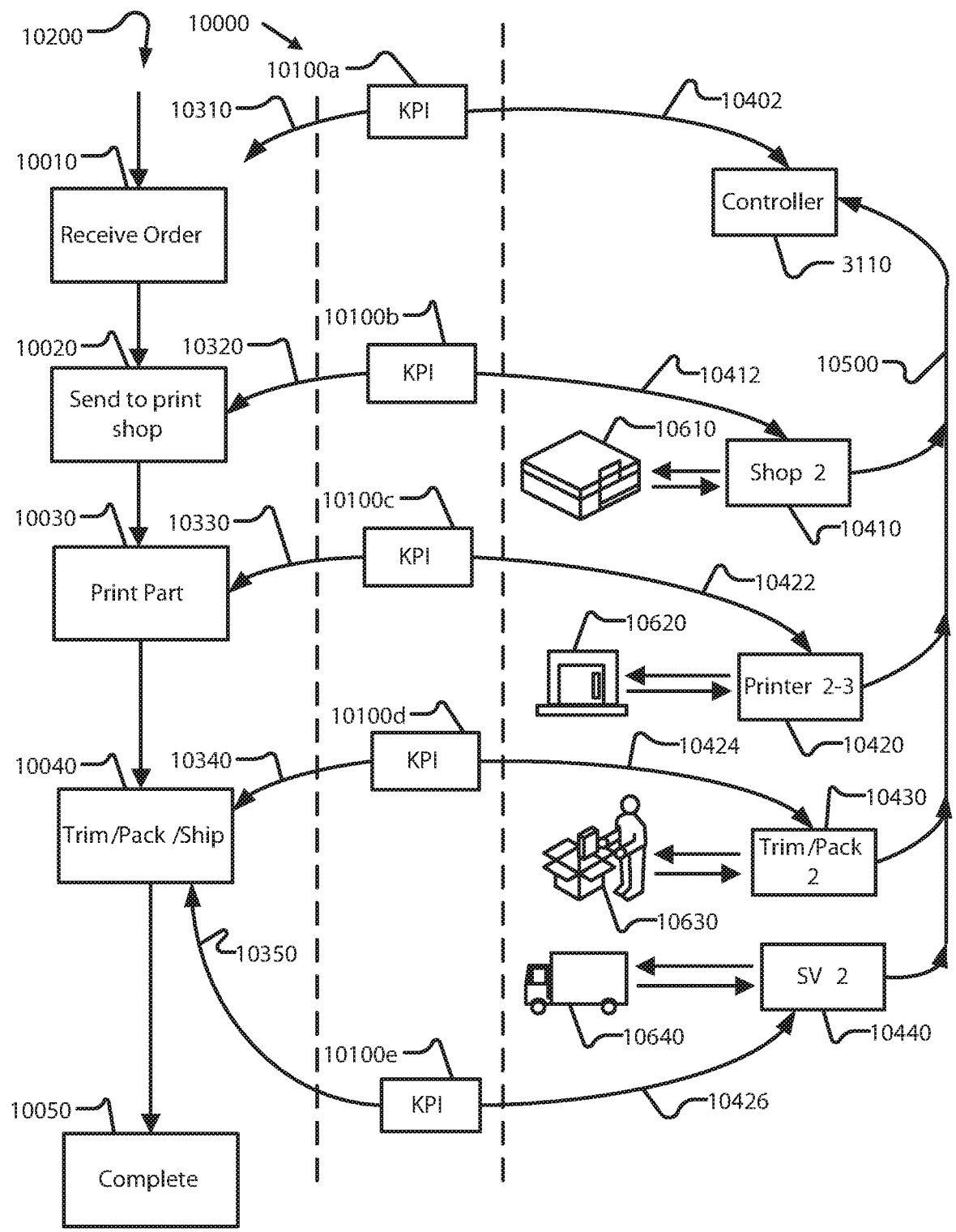
FIG. 10 depicts an exemplary schematic diagram of an example control system flow and exemplary simplified implementation for managing a non-limiting automated example additive manufacturing process in accordance with external KPI metrics.

FIG. 10 illustrates the example process steps (10200) and a simplified implementation of the KPIs monitoring in an example implementation. The system is using an exemplary simplified process (10000) to implement an example additive manufacturing process (10200), using a process definition of five steps, comprising a first step of receiving an order for a 3D printed part (10010), a second step of sending the order to part printing selected from among available print shops (10020), a third step of printing the part at the selected print shop (10030), a fourth step of trimming, packing, and shipping the printed part (10040), and a final step of marking the order complete (10050). The manufacturing process is constructed as a set of node instances.

The additive manufacturing process (10200) is subject to a set of KPIs. Here, the KPIs include a first KPI (10100a) for overall order fulfillment time of 48 hours and part cost of $40. A second KPI part queue time KPI (10100b) for 6 hours represents an amount of time between receipt of a part at a particular shop and beginning of a print operation to produce the part. Part printing time KPI (10100c) for 12 hours and $20.00 specifies a limit on an amount of time spent printing a part, including setting up a printer for a print job and running the print job. The KPIs also include a fourth KPI (10100d) for part trimming and packaging time of 4 hours and a cost of $7.50. Trim/packaging time (10100d) represents a limit on an amount of time to clean up a printed part, e.g., to remove sacrificial support features required for printing but not part of the final part, to perform any other post-print finishing, and to package and label the part for shipping. In an alternative example, each of the multiple steps that can affect part print time KPI (10100c) and trim packaging time KPI (10100d) can include a separate associated KPI. These separate associated KPIs are effectively collapsed into the exemplary KPIs of the present example for simplicity and clarity. The KPIs include a fifth KPI (10100e) for a shipping delivery time of 24 hours and a cost of $5.00.

| KPI | Elapsed time | Cost |
| --- | --- | --- |
| Order fulfillment (10100a) | 48 hours | $40.00 |
| Part queue time (10100b) | 6 hours | |
| Part print time (10100e) | 12 hours | $20.00 |
| Trim/packing time (10100d) | 4 hours | $ 7.50 |
| Delivery (10100e) | 24 hours | $ 5.00 |

As shown in FIG. 10, the additive manufacturing process (10200) is selected (8210) for management and execution by the system. This system manages the manufacturing process in accordance with a set of dynamically configurable node instances (10410, 10420, 10430, and 10440) each associated with a process step (10020, 10030, and 10040) of the additive manufacturing process (10200). KPIs are associated with the overall process and with individual process steps as defined for process 8000. After the process is selected, the step of selecting the relevant KPIs is performed and the selected KPIs are allocated to specific one or more steps (e.g. states of a DFSA) and assigned to one or more node instances. In this example, the part print time KPI (10100b) is allocated (10320) to the send to print shop process step (10020), the part print time KPI (10100c) is allocated (10330) to the print part step (10030), the trim/packaging time KPI (10100d) is allocated (10340) to the trim/pack/ship step (10040), and the delivery time KPI (10100e) is also allocated (10350) to the trim/pack/ship step (10040). Overall order time and cost KPI (10100a) is allocated (10310) to the overall process (10200).

Once KPIs are allocated to individual steps of the manufacturing process (10200), the node instances and associated processing resources to be used when the process is executed are selected. Selecting processing resources includes selecting nodes associated with each process resource and node programs to be instantiated on on a computing resource, e.g., by controller service (3110). Processing resources are assigned as needed and available, and as their historical and current process metrics relate to the KPI requirements defined above.

The system searches the node repository for templates that specify node instances to which a part queue time KPI (10100b) can be assigned. The system finds two print shop templates, each associated with a different part printing shop (print shop 1, print shop 2) and each including part queue time among a list of KPIs that can be assigned to a print shop program specified by the print shop template and each including historical KPI data for that store, e.g., performance data saved associated with the template during a previous program execution defined by the print shop template, and other information that can be used by the system for making node selection such as, for example, each store's geographical location. Similarly, the system searches the node database for templates that specify part print time (10100*c*), trim packing time (10100*d*), and delivery time (10100*e*). The system discovers five printer templates to which part print time KPIs can be associated. Each printer template is associated with a different printer (printers 1-1 and 1-2 located at print shop 1, and printers 2-1, 2-2, and 2-3 located at print shop 2). Printer templates can include information regarding an associated printer that can be used by the system when selecting a printer, such as part resolution and a list of materials that the printer is capable of using for printing parts. The system discovers two trim/pack templates to which trim/packing time KPIs can be assigned, each trim/pack template specifying a different trim/pack processing station (trim/pack 1 located at print shop 1 and trim/pack 2 located at print shop 2). Note that selection of specific printers and trim/pack station to use while executing process (10200) will be limited by the selection of which print shop to use, i.e. if print shop 1 is selected, either printer 1-1 or printer 1-2 may be selected. The system finds three shipping vendor templates to which delivery time KPIs can be assigned. Each shipping vendor template specifies a different shipping vendor (shipping vendor 1, shipping vendor 2, and shipping vendor 3).

When processing the additive manufacturing process (10200), the system notes the receive order step (10010) time as its starting time for the use with the total order fulfillment time KPI (10100*a*). The system also calculates and choses process steps and node selections that permit the overall process to complete within the allocated KPIs. As part of this setup process, the system obtains the historical metrics for the candidate process steps and nodes, and then begins a process of goal seeking to identify a solution, eliminating from consideration those steps and node instances that do not support the process completion within all the KPIs.

In this example, the system uses a node selection process, such as described in the monitoring and control method (4000) above, to determine which of the print shops to select and execute, i.e. which part print shop to select and send the order to send to print shop step. In this example, each print shop communicates part queue data to controller service on an ongoing basis and the system uses current queue data, listed in the table below, to select from among the possible choices. The system determines that print shop 1 has a current queue time of 6 hours and print shop 2 has a current queue time of 4 hours, both of which satisfy the part queue time KPI (10100*b*) of 6 hours. The system evaluates historical KPI data stored in the trim/pack templates and projects that total trim/pack time for both print shops will be 1.5 hours which satisfies the trim/packing time KPI (10100*d*) of four hours. The system selects print shop 2 because it has a shorter current part printing queue. In an alternative example, the system could use other data such as historical printer KPI data for each of the printers when selecting a print shop.

The system limits selection of printers to those associated with the selected Print Shop 2. In this example, the system evaluates historical KPI data stored in the printer templates and projects that print times for all printers will be less than the part print time KPI (10100*c*) of 12 hours. The system determines that Printer 2-3 will have the shortest print time, 9.75 minutes, and therefore selects Printer 2-3.

The system uses a similar comparison of historical data to KPI metric requirements to select a shipping vendor to use when executing trim/pack/ship step (10040). In this example, ship vendor 2 is selected because it is the only vendor that meets both the elapsed time and cost KPIs.

| Node | Budget Elapsed time | Historical Elapsed time | Budget Cost | Historical cost |
|---|---|---|---|---|
| Print shop 1 | 6.00 | 8.00 | N/A | N/A |
| Printer 1-1 | 12.00 | 10.00 | $20.00 | $16.60 |
| Printer 1-2 | 12 00 | 11.50 | $20.00 | $19.20 |
| Trim/Pack 1 | 4.00 | 1.50 | $ 7.50 | $ 5.00 |
| Print shop 2 | 6.00 | 4.00 | N/A | N/A |
| Printer 2-1 | 12.00 | 10.00 | $20.00 | $16.60 |
| Printer 2-2 | 12.00 | 11.50 | $20.00 | $19.20 |
| Printer 2-3 | 12.00 | 9.75 | $20.00 | $16.25 |
| Trim/Pack 2 | 4.00 | 1.50 | $ 7.50 | $ 5.00 |
| Ship vendor 1 | 36.00 | 30.00 | $ 5.00 | $ 5.00 |
| Ship vendor 2 | 36.00 | 23.00 | $ 5.00 | $ 5.00 |
| Ship vendor 3 | 36.00 | 28.00 | $ 5.00 | $ 7.00 |

The system can use additional criteria for determining which part print shop to select. In an alternative example, the system uses the geographical location of each print shop relative to the delivery address for the order when selecting which part print shop to use. The system selects the closest shop as long as the selected print shop can meet the KPIs.

After determining what resources to assign the process steps, the system executes each step monitors process step execution, and makes adjustments as needed (8240). When the system executes send to print shop process step (10020), provisioner (3115) will execute the node template associated with print shop 2 to execute the node instance specified by the template and install, instantiate, and provision the node instance specified by the print shop 2 template, i.e. node Shop 2 (10410). Node shop 2 (10410) communicates with part print shop 2 (10610). When the system executes print part process step (10030), provisioner (3115) will execute the node template associated with printer 2-3 and install, instantiate, and provision the associated node program, node Printer 2-3 (10420) which establishes communication with printer 2-3 (10620). When trim/pack/ship process step (10400) is executed, the system will similarly install, instantiate, and provision node trim/pack 2 (10430), which is associated with the trim/pack location 2 (10630), and node SV 2 (10440), which is associated with shipping vendor 2 (10640).

The system uses an automated KPI assignment and rollup process, for example process (5000), to assign KPI metrics to installed and instantiated node instances (10410 through 10440) and to roll up KPI-related data collected by each of the node instances. The part queue time KPI (10100*b*) is assigned (10412) to the shop 2 node (10410) which monitors and reports current part queues at part print shop 2 (10610). The part print time KPI (10100*c*) is assigned (10422) to Printer 2-3 node (10420) which collects and reports data including progress of the part print run on Printer 2-3 (10620). The printer 2-3 node (10420) can also automatically set up the printer and initiate the part print run, i.e. convert a solid model into part slice data usable by the printer, program printer controls for material selection and process resolution, and start the configured print job. The trim/pack KPI (10100*d*) is assigned (10424) to the trim/pack node (10430) which communicates with trim/pack location 2 (10630) to gather performance-related data. The delivery KPI (10100*e*) is assigned (10426) to the SV2 node (10440) which communicates with external shipping vendor 2 (10640) to track expected package pickup times and delivery status information. The overall order fulfillment KPI (10100*a*) is assigned (10402) to the controller service.

In a first monitoring process example, the system monitors the execution of the print part step (10030) and determines the selected printer (printer 2-3 (10620)) is offline for servicing and will not be available for the following 48 hours. The system further determines that the other printers at shop 2 (printers 2-1 and 2-2) are not capable of printing the part using a desired material and a desired resolution. The system optionally alters a system administrator, and optionally takes back the order and reassigns it to shop 1 and to printer 1-2, with the same make and model printer as printer 2-3 and is capable of printing the part using the desired material and at the desired resolution.

Title: Goal Seeking Process Engine Management of an Internal Order Fulfillment Process In a third non-limiting example implementation, the system is implemented for improving the automation of an internal order fulfillment process at a multi-store retail firm, where the ordering process automation is implemented using the components of a controller service (3110).

Figure 11:
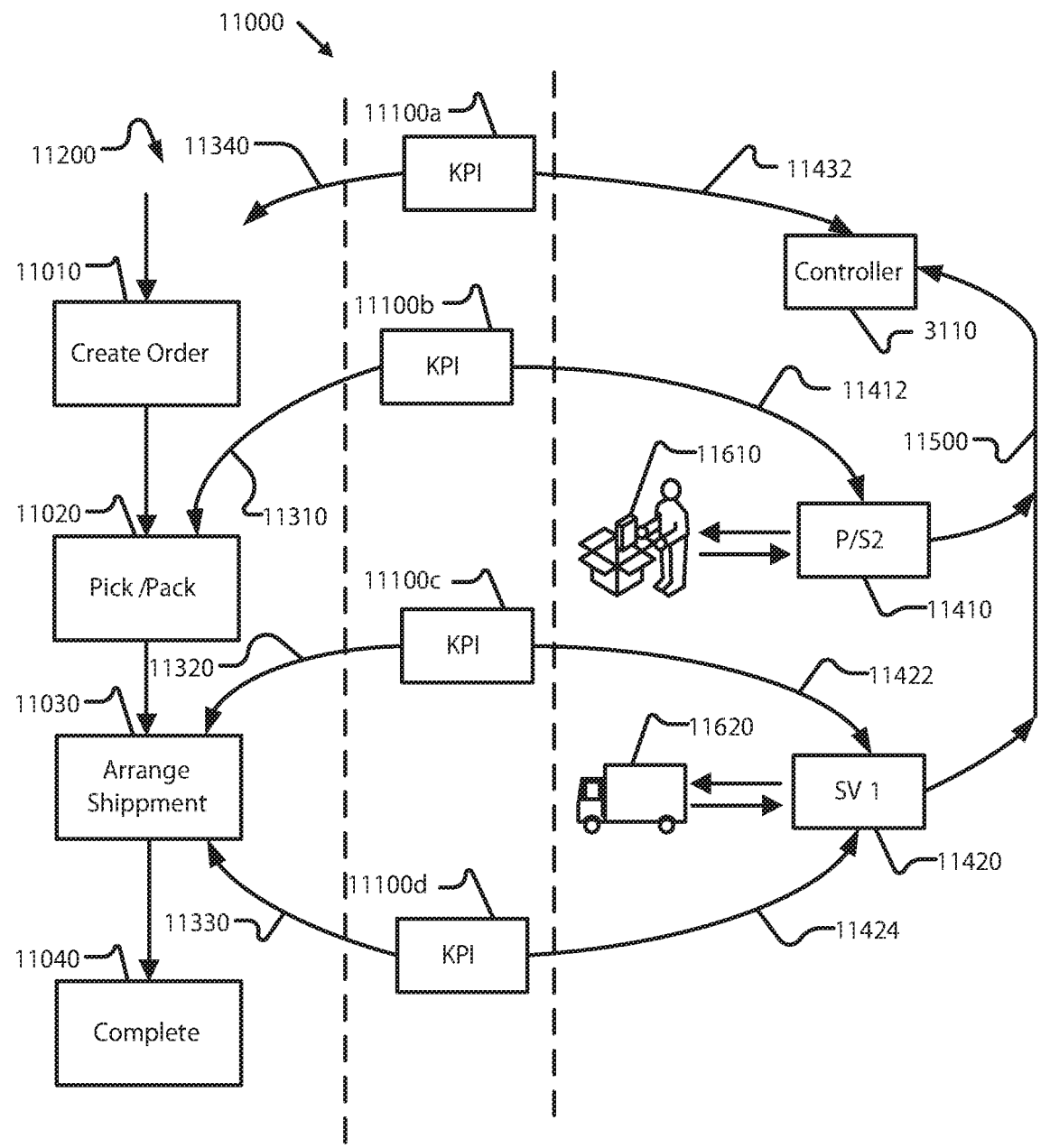
FIG. 11 depicts an exemplary schematic diagram of an example control system managing a non-limiting process workflow in accordance with external KPI metrics for improving the automation of an example order fulfillment process.

The system uses an example simplified process (11000) to implement an example order fulfillment process (11200), as depicted in FIG. 11. The process definition has four steps, comprising a first step of creating an order (11010), a second step of assigning the order for picking and packing (11020), a third step of arranging for a delivery vendor to pick up the order and deliver it (11030), and a final step of marking the order complete (11040). The order process is constructed as a DFSA instance comprising a set of node instances using the methods described above. The order process is also subject to some KPIs, in this case, a first KPI (11100a) for overall order fulfillment time of 36 hours and cost of $10.00, a KPI (11100b) for order pick and pack time of 15 minutes and labor cost of $2.50, a third KPI (11100c) for shipment pickup time of 12 hours, and a fourth KPI (11100d) for total pickup to delivery time of 24 hours and delivery cost of $5.00. Note that the KPIs are presented in expanded form for clarity, in some implementations; KPIs may be combined, such as KPI (11100a) and KPI (11100d).

| KPI | Elapsed time | Cost |
| --- | --- | --- |
| Order fulfillment (11100a) | 36 hours | $10.00 |
| Pick/Pack time (11100b) | 15 minutes | $ 2.50 |
| Pickup time (11100c) | 12 hours | |
| Delivery (11100d) | 24 hours | $ 5.00 |

FIG. 11 illustrates the example process flow and a simplified implementation of a system. This system manages the order fulfillment process in accordance with a set of dynamically configurable node instances, each associated with a process step (11010, 11020, 11030, and 11040) of process (11200) and KPIs, and is illustrative of the KPI association and process management in accordance with at least one aspect of the system. As shown in FIG. 11, the order fulfillment process is selected for management and execution by the system, the FSA conversion is completed (or an FSA template is selected), and KPI are assigned. Next, the step of selecting the relevant KPIs from the available KPIs is performed and the selected KPIs are allocated to specific one or more process steps and assigned to one or more program instances instantiated when the process step is executed.

In this example, the pick/pack time KPI (11100b) is allocated (11310) to the pick/pack process step (11020), the shipment pickup time KPI (11100c) is allocated (11320) to the arranged shipping step (11030), and the KPI for total delivery time (11100d) is also allocated (11330) to the arrange shipping step (11030). Overall order time and cost KPI (11100a) is allocated (11340) to the overall process (11200).

Once KPIs are allocated to the process (11200), the nodes and associated processing resources to be used when the process is executed are selected. Processing resources are assigned as needed and available, and as their historical and current process metrics relate to the KPI requirements defined above.

The node selection step includes searching the node repository (3160) to find available node definitions, and associated processing resources, that could be used and then selecting specific nodes, based on KPIs and other consideration, to use when process (11200) is implemented. The system uses provisioner service (3115) to search node repository (3160) for node templates that specify node instances matching the specified KPI parameters (11100a-11100b). The system searches the node repository for templates that specify node instances to which a Pack/Ship KPI (11100b) can be assigned. The system finds two ship-from node templates which each include Pick/Pack KPI among a list of KPIs that can be assigned to a Pick/Pack program instance specified by the template. Each ship-from template is associated with a different store from which an order may be shipped (Pack/Ship location 1 and Pack/Ship location 2) and includes historical KPI data for that store, e.g., performance data that was saved to the template during a previous execution of the template, and other information that can be used by the system for making node selection such as, for example, each store's geographical location. Similarly, the system searches the node database for templates that specify pickup time KPI (11100c) and delivery KPI (11100d). The system discovers three shipping vendor node templates, each corresponding to a different shipping vendor and each listing both pickup time (11100c) and delivery (11100d) as KPIs that can be assigned to an Arrange Shipment workflow DFSA instance specified by the template.

When processing the order, the system notes the order time as its starting time for the use with the order-to-delivery time KPI (11100a). The system also calculates and choses process steps and node selections that permit the overall process to complete within the allocated KPIs. As part of this setup process, the system obtains the historical metrics for the candidate process steps and nodes, and then begins a process of goal seeking to identify a solution, eliminating from consideration those steps and nodes that do not support the process completion within all the KPIs.

In this example, the system uses a node selection process, such as described in the monitoring and control method (4000) above, to determine which of the two ship-from templates to execute and which of the shipping vendor templates to execute, i.e. which pack/ship location and which shipping vendor to select. In this example, historical data, listed in the table below for elapsed time and cost, are used to select from among the possible choices. The process evaluates historical KPI data stored in the ship-from templates and projects that total pick/pack time for pack/ship location 1 will be 20 minutes, which is greater than the specified pick/pack elapsed time KPI metric (11100b) of 15 minutes associated with Pick/Pack process step (11020) and therefore skips pack/ship location 1 for further consideration. The system projects, based on historical data, an ending pick/pack time of 10 minutes for pack/ship location 2, which is less than the specified pick/pack elapsed time KPI (11100b) metric. The process next evaluates historical cost data for shipping location 1 against the pick/pack cost metric specified by KPI (11100*b*) and projects that an ending cost associated with pack/ship location 2 ($2.25) will fall below the allowable KPI limit of $2.50. Based on the projected ending metrics, the system selects pack/ship location 2 and assigns the order to the associated store.

The system uses a similar comparison of historical data to KPI metric requirements to select a ship vendor to use when executing arrange shipment process step (11030). The historical elapsed time listed for each ship vendor includes combined pickup and delivery elapsed time KPI (i.e. 12 hours pickup time KPI (11100*c*) and 24 hour delivery time KPI (11100*d*) for shipping vendor combined elapsed time KPI of 36 hours). In this example, ship vendor 1 is selected because it is the only vendor that meets both the elapsed time and cost KPIs.

| Node | Budget Elapsed time | Historical Elapsed time | Budget Cost | Historical cost |
|---|---|---|---|---|
| Processing node 1 | 1.00 | 0.50 | $1.00 | $1.00 |
| Processing node 2 | 1.00 | 4.00 | $1.00 | $1.00 |
| Pack/ship location 1 | 15.00 | 20.00 | $2.50 | $1.75 |
| Pack/ship location 2 | 15.00 | 10.00 | $2.50 | $2.25 |
| Ship vendor 1 | 36.00 | 30.00 | $5.00 | $5.00 |
| Ship vendor 2 | 36.00 | 23.00 | $5.00 | $7.00 |
| Ship vendor 3 | 36.00 | 36.00 | $5.00 | $5.00 |

The system can use additional criteria for determining which pack/ship location to select. In an alternative example, the system discovers during a search of the template store that three pack/ship locations are potentially usable at Pick/Pack process step (11020) but determines that one of the pack/ship locations is currently offline for some reason, e.g. the store in which the pack/ship location is housed is temporarily closed. The system skips the closed store, and any other currently unavailable pack/ship locations, for consideration for use while executing Pick/Pack process step (11020).

The system considers how selection of a particular node to fulfill a first process step would affect a KPI associated with a second process step. For example, the system uses geographical location information included in the node template associated with each pick/pack location to determine the effect of selecting a location would have on the shipping cost KPI (11100*d*) associated with the Arrange Shipment process step (11030). The process skips those pack/ship locations associated estimated shipping cost above KPI limit (e.g. skipping Anchorage, Ak. store to ship to east coast).

After determining what resources to assign the process steps, the system executes each step, monitors process step execution, and makes adjustments as needed (8240). When the system executes pick/pack process step (11020), provisioner (3115) will use the node template associated with pack/ship location 2 to instantiate a node instance specified by the template and install, instantiate, and provision the node instance specified by the pack/ship location 2 template, i.e. node P/S2 (11410) which is associated with pack/pick location 2 (11610). When the system executes Arrange Shipment process step (11030), provisioner (3115) will execute the node template associated with shipping vendor 1 (11620) and install, instantiate, and provision the associated node program, node SV1 (11420), which is associated with shipping vendor 1 (11620). The system can install and instantiate one or more node programs (computer programs associated with a node definition in a template or instance specification) prior to executing the associated process step.

Node SV1 (11420) can be started when execution of process (11200) begins and node SV1 (11420) can begin collecting KPI-related data from shipping vendor 1 (11620) to enable predictive control of the process execution, i.e. to provide the system with data that the system can use to make an alternate shipper selection while the pick/pack step (11020) is being executed.

The system uses an automated KPI assignment and rollup process, for example process (5000), to assign KPI metrics to installed and instantiated node instances (11410, 11420) and to roll up KPI-related data collected by the node instances. The pack/ship KPI (11100*b*) is assigned (11412) to the pack/ship location 2 node (11410). The pickup KPI (11100*c*) is assigned (11422) to ship vendor 1 node (11420) and delivery KPI (11100*d*) is also assigned (11424) to shipping vendor 1 node (11420). The overall fulfillment KPI (11100*a*) is assigned (11432) to a controller server, e.g., a server comprising a controller service (3110). Pack/ship location 2 node (11410) communicates with pack/ship location 2 (11610), and shipping vendor 1 node (11420) communicates with shipping vendor 1 (11620), to send instructions and receive KPI-related data. The nodes (11410, 11420) communicate (11500) collected KPI data to a controller service. The overall order time and cost KPI (11100*a*) is effectively assigned to the controller service which uses data received from nodes (11410, 11420) to track and manage the overall process (11200).

In a first monitoring process example, the system monitors the execution of the Pick/Pack process step and determines that, after 20 minutes, the process step has not completed. The system determines that the Pick/Pack time KPI (11100*b*) has been exceeded, optionally alters a system administrator, and optionally takes back the order and reassigns it to another store.

In a second monitoring example, the system monitors the execution of the Pick/Pack process step and increments elapsed time and accrued cost metrics each time the DFSA instance collects data from the selected pack/ship location. The system can calculate accrued cost by multiplying an hourly wage rate by the accrued time. When the Pick/Pack process completes, the system reports the actual cost associated with completing the process and updates the historical data for with the pack/ship location and the associated DFSA template.

Title: Monitoring and Control of Traditional BPEL System

In a fourth non-limiting example implementation, a controller server of the described design is used to improve the monitoring and control of an existing prior art workflow processing system by integrating the metrics collection, monitoring, and reporting with a prior art process automation system. Similar architectures may be used to improve the monitoring and control of prior art process control systems.

In this example implementation, the controller server implements a DFSA instance that monitors and controls a prior art process automation system, and implements management of that system in accordance with one or more external metrics (KPIs) that are integrated as part of the DFSA instance (but not the legacy process automation system) as described above. The prior art process automation system (3710) is configured to implement a process automation workflow such as, for example, BPEL encoded workflow (1000) as illustrated in FIG. 1.

The prior art process automation system is implemented as an external resource (2700) to the controller server, and includes an API that enables communication with the controller server via external systems interface (3198). The API enables the controller system to interact with the prior art process automation server in order to select and start a BPEL workflow, start and stop individual BPEL process steps, check the status and completion of the process and the status of individual process steps, collect metrics associated with the process and process steps, and cancel a process or process step. In some embodiments, the API enables the controller system to reconfigure or influence the execution of a running workflow. The API is preferably asynchronous to the actual process works but can be synchronous.

The controller server manages an external process automation system by accessing its API by the services of a controller server, including the following management and control services: controller service (3110), provisioner (3115), node repository (3160), node monitor (3135), node manager (3120), flow analyzer (3105), fault analyzer service (3150), predictor service (3140), and external systems interface (3198). The controller server configures external resource interface to communicate with the API by polling, push/pull notification, or both polling and notification. A communication link is thus established between the API and communication interface.

The DFSA instance includes at least one node instance configured to interact with an external process automation system. The controller server configures that node instance to communicate with the external process automation server and assigns all KPIs associated with the BPEL workflow process to the node instance. The node instance communicates with the external process automation system API via external systems interface (3198). The node instance instructs the external process automation system, via control message(s) sent to the API, to start the BPEL workflow process, configures the external systems interface for polling or notification or both, and then monitors the BPEL workflow process as it runs on the external process automation system.

The node instance receives performance data from the external process automation server related to the configured KPIs. In the present example, the KPIs tracked by the controller server include shipping vendor KPIs. In this example, the node instance receives at least clock time and cost information related to shipping an order, makes that received information available to the controller server, and after updating the KPI completion calculations, can stop or roll back a shipping process step if, for example, a "pickup order" KPI is exceeded. The controller server can notify an operator that the shipment has been canceled with the vendor associated with process step (Shipping Vendor 1) and fail the overall process. Alternatively, the controller server can, in some implementations, cancel or roll back process step and automatically start the alternative process step, transferring the order to Shipping Vendor 2.

The controller server may synchronously or asynchronously receive status notifications from the external process automation system. Synchronous notifications may include status or process step updates (e.g. process step start, process step stop) as well as performance data. Asynchronous notifications may include exception notices such as notification of a process step failure. If the controller server receives an exception notice from the external process automation system, for example a notice that a process step has failed to execute or is executing in an unexpected manner, the controller server can issue instructions to the external process automation system (via its API interface) to stop the faulty process step and, in some cases, start another process step, for example, to start a second process step if a first step fails.

Upon receiving a process completion status update, the controller server can manage other aspects of the DFSA instance (not described), which may include initiating additional processes on external process automation system.

In a further example, the controller server may communicate with the external process automation systems API in order to provide data to the external process automation system that can influence process decision points. For example, criteria used by the external process automation system to select a decision option at a decision step can include data provided to the external process automation system by the system via the API. In the current example, the a node instance operating on the controller server may collecting KPI-related metrics related to Shipping Vendor 1 and Shipping Vendor 2 before the respective process blocks are executed on the external process automation system. For example, the node instance might begin collecting shipper-related metrics when the external process automation system begins processing its legacy process. The collected shipper-related metrics are passed to predictor service (3140) which can determine predictive bottlenecks in the processing. If predictor service (3140) predicts a bottleneck at a shipper, e.g., if a bottleneck is predicted at Shipping Vendor 1, the controller server can provide a input to a decision step that causes the selection of Shipping Vendor 2 or that, when combined with other criteria used by the external process automation system to make a selection, weights the decision more heavily in favor of one process step over another (peered) process step.

Alternatively, the controller server may override the external process automation server process step selection and instruct the external process automation server to select or begin a specific process step on the basis of one or more collected metric.

Example: Restoration of Prior DFSA Instance During Recovery from a Failure

In an embodiment, the system supports the phased recovery of a previously failed DFSA instance (or node instance) as described below. For example, if an external resource fails, and the DFSA instance definition is modified to use an alternative resource, there are two modes for recovery. The first is to continue to operate with the new configuration, and the second is to monitor the failed node instances (and resources) and once they appear to have recovered their normal operating parameters, restore operations to using those now recovered node instances and resources.

In the first recovery mode, no action is required as the system has already rewritten the DFSA templates, node templates, and DFSA instance definitions.

In the second recovery mode, the system identifies the previously failed DFSA templates and node templates. One way of identifying these templates is by comparing them to the current templates and comparing modification times. Once the prior templates are identified, new instances requiring templates may select from either the current (modified) template or the previous (unmodified) template. This has the effect of phasing the operational load back onto the failed node or DFSA instance. If the node or DFSA instance fails again, the system backs off its recovery for a period of time and then tries again. If the node or DFSA instance does not fail again, an increasing percentage of template uses select the original (recovered) template for use, until no running instances are using the modified templates. At that point, the modified template(s) may be deleted from the system.

The system can be specially constructed for the required purposes, or it can be a general-purpose computer selectively activated or configured by a computer program stored in the computer. The processes presented above are not inherently related to any particular computer or other computing apparatus. In particular, various general-purpose computers can be used with programs written in accordance with the teachings or, alternatively, it can be more convenient to construct a more specialized computer system to perform the required operations.

The example non-limiting technology employs various computer implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. All of these and similar terms are to be associated with the appropriate physical quantities and are merely convenient labels applied to these quantities.

The example non-limiting technology can be implemented in digital electronic circuitry, or in computer hardware, firmware, software, or in combinations. Apparatus can be implemented in a computer program product tangibly embodied in a machine-readable storage device for execution by a programmable processor; and method steps can be performed by a programmable processor executing a program of instructions to perform functions by operating on input data and generating output. The example non-limiting technology can be implemented advantageously in one or more computer programs executable on programmable systems including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and the language can be a compiled or interpreted language. Suitable processors include, for example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including for example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the example non-limiting technology can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as other computers. The computer system can be programmed to provide a graphical user interface through which computer programs interact with users.

Finally, the processor can be coupled to a computer or telecommunications network, for example, an Internet network, or an intranet network, using a network connection, through which the processor can receive information from the network, or might output information to the network while performing the above-described method steps. Such information, which is often represented as a sequence of instructions to be executed using the processor, can be received from and output to the network, for example, in the form of a computer data signal embodied in a carrier wave. The above-described devices and materials will be familiar to those of skill in the computer hardware and software arts.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, those skilled in the art will recognize that its usefulness is not limited thereto and that the present invention can be beneficially utilized in many environments and implementations. The claims set forth below should be construed in view of the full breadth and spirit of the invention as disclosed and claimed.

We claim:

1. A system comprising:
   a first finite state machine that operates in accordance with a distributed finite state automata instance specification;
   a second finite state machine that operates in accordance with the distributed finite state automata instance specification;
   a metrics data collector operatively coupled to the first and second finite state machines, the metrics data collector collecting time-based metrics data indicating a process performance state of at least one part of the first finite state machine and a process performance state of at least one part of the second finite state machine; and
   at least one processor connected to non-transitory storage that stores a performance specification comprising one or more process performance condition metrics related to operating the first or second finite state machine and instructions for execution by the at least one processor, the instructions at least in part controlling the at least one processor to communicate with the metrics data collector in order to process the collected time-based metrics data to predict whether the first finite state machine is operating in a way that will not meet at least one time-based process performance condition metric specified by the performance specification;
   the at least one processor dynamically, in real time, changing the distributed finite state automata instance specification at least in part in response to predicting that operating the first finite state machine will not meet the at least one time-based process performance condition metric to thereby enable the second finite state machine to meet the at least one time-based process performance condition metric.

2. The system of claim 1 wherein the first and second finite state machine each comprise manufacturing machines.

3. The system of claim 1 wherein the system further includes a storage device that saves the changed distributed finite state automata instance specification.

4. The system of claim 3 wherein the system further includes a finite state machine provisioner configured to use the saved distributed finite state automata instance specification to create a new instantiation of the first and/or second finite state machine.

5. The system of claim 1 further including a finite state machine provisioner configured to change the first and/or second finite state machine in response to the changed distributed finite state automata instance specification.

6. The system of claim 1 wherein the time-based metrics comprise key performance indicators that indicate process times, enabling detection of processing slowdowns, timing overruns and elapsed time a process has been running.

7. A method of automatically dynamically managing and reconfiguring a distributed finite state automata specification instance comprising:
  (a) using at least one computer, collecting time-based metrics indicating state of timely performance of at least one part of a distributed finite state automata instance;
  (b) analyzing, with the at least one computer operatively connected to monitor operation of the at least one part of the distributed finite state automata instance, the collected time-based metrics to predict whether continued operation of the at least one part of the distributed finite state automata instance will not meet at least one time-based performance indicator specified by a performance specification;
  (c) conditioned on the prediction, the at least one computer automatically dynamically reconfiguring a distributed finite state automata specification to account for operational conditions with respect to the at least one time-based performance indicator; and
  (d) instantiating a new finite state automata instance based at least in part on the reconfigured distributed finite state automata specification.

8. The method of claim 7 wherein the distributed finite state automata instance performs manufacturing.

9. The method of claim 7 wherein the distributed finite state automata instance performs shipping.

10. The method of claim 7 wherein the distributed finite state automata instance performs electronic commerce.

11. The method of claim 7 wherein the dynamic reconfiguring provides process control operating range and capabilities and integrates process control monitoring and management, extends real-time operation and control to process handling, and provides real-time process control and monitoring.

12. The method of claim 7 further including enabling management of the distributed finite state automata instance to externally defined completion goals.

13. The method of claim 7 wherein the dynamic reconfiguring provides dynamically determined process flexibility, extended operating range, and extended process automation definition capabilities.

14. The method of claim 7 wherein the dynamic reconfiguring provides error recovery and exception handling.

15. The method of claim 7 wherein the dynamic reconfiguring includes changing an operating process automation definition instance in order to change its performance to fulfill one or more higher level timing goals dynamically associated with one or more distributed finite state automata instances.

16. The method of claim 7 including meeting real-time changing operational constraints without requiring reprogramming or operator intervention.

17. A dynamically extensible process automation system comprising:
  at least one first computing device operationally coupled to one or more further computing devices providing a distributed finite state automata instance defined by a distributed finite state automata instance specification,
  the at least one first computing device comprising a distributed finite state automata monitoring service and an externally provided distributed finite state automata performance specification, the externally provided distributed finite state automata performance specification having been integrated into the distributed finite state automata instance,
  the at least one first computing device executing the distributed finite state automata monitoring service to monitor operation of the distributed finite state automata instance associated with a node instance that implements a state of the distributed finite state automata instance for that node instance's performance against the distributed finite state automata performance specification,
  the at least one first computing device being configured to automatically dynamically change the distributed finite state automata instance specification based at least in part on predicting that at least one time-based performance indicator specified by the distributed finite state automata performance specification will not be met by continued operation of the distributed finite state automata instance, and to instantiate a new distributed finite state automata instance based on the changed distributed finite state automata instance specification.

18. The system of claim 17, further including instantiating the new distributed finite state automata instance in a way that does not require restarting some or all of the distributed finite state automata instance.

19. The system of claim 17, wherein the new distributed finite state automata instance is used for a next instantiation of a currently non-executing distributed finite state automata instance.

20. The system of claim 17 wherein the at least one node instance comprises a computer paired with the distributed finite state automata instance.

21. The system of claim 20 wherein the computer enforces implementation of a manufacturing recipe.

22. The system of claim 17 wherein the distributed finite state automata instance comprises a manufacturing process controller.

23. The system of claim 17 wherein the distributed finite state automata instance comprises a shipping device.

24. The system of claim 17 wherein the distributed finite state automata instance comprises an ecommerce device.

25. The system of claim 17 wherein the at least one first computing device is further configured to dynamically change the distributed finite state automata instance specification by dynamically adding operating steps to or subtracting operating steps from the distributed finite state automata instance specification.

26. The system of claim 17 wherein the at least one first computing device is further configured to dynamically change a computing resource assigned to implement the node instance.

* * * * *